US011533185B1

(12) United States Patent
Sharma et al.

(10) Patent No.: US 11,533,185 B1
(45) Date of Patent: Dec. 20, 2022

(54) SYSTEMS FOR GENERATING AND MANAGING CERTIFICATE AUTHORITIES

(71) Applicant: Amazon Technologies, Inc., Seattle, WA (US)

(72) Inventors: Param Sharma, Haymarket, VA (US); Jonathan Kozolchyk, Seattle, WA (US); Todd Cignetti, Ashburn, WA (US); Kyle Benjamin Schultheiss, Centreville, VA (US); Josh Rosenthol, Centreville, VA (US); Jose Maria Silveira Neto, Herndon, VA (US); Yiwen Wu, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/910,010

(22) Filed: Jun. 23, 2020

Related U.S. Application Data

(60) Provisional application No. 62/865,809, filed on Jun. 24, 2019.

(51) Int. Cl.
*H04L 9/32* (2006.01)

(52) U.S. Cl.
CPC .................... *H04L 9/3268* (2013.01)

(58) Field of Classification Search
CPC . H04L 9/3268; H04L 63/0823; H04L 9/3247; H04L 9/3265; H04L 2209/38; H04L 9/3263; G06F 21/33
See application file for complete search history.

(56) References Cited

U.S. PATENT DOCUMENTS

| | | | | |
|---|---|---|---|---|
| 2010/0268942 | A1* | 10/2010 | Hernandez-Ardieta | ..................... H04L 9/3268 713/156 |
| 2015/0236860 | A1* | 8/2015 | Brown | ...................... H04L 9/32 713/156 |
| 2017/0048071 | A1* | 2/2017 | Ignatchenko | ....... H04L 63/0428 |
| 2018/0198631 | A1* | 7/2018 | Yang | ................... H04W 12/086 |
| 2018/0287804 | A1* | 10/2018 | Geisbush | ............ H04L 63/0442 |
| 2019/0068381 | A1* | 2/2019 | Takemori | .................. H04L 9/08 |

* cited by examiner

*Primary Examiner* — Kristine L Kincaid
*Assistant Examiner* — Zoha Piyadehghibi Tafaghodi
(74) *Attorney, Agent, or Firm* — Lee & Hayes, P.C.

(57) ABSTRACT

Systems and method for generating and managing certificate authorities. For instance, a certificate service may provide one or more user interfaces for creating certificate authorities, such as a root certificate authority, a subordinate certificate authority, and/or an intermediate certificate authority. For example, a user may use a user device to create a certificate hierarchy. The certificate service may also provide one or more user interfaces for issuing certificates using the certificate authorities. One or more computing resources may then use the end-entity certificates issued from the certificate authority hierarchy for authentication and/or encryption. For security purposes, the certificate authority may also allow the user to set policies representing users that are able to access and/or utilize the certificate authorities to perform actions, such as issuing certificates. The certificate service may also generate audit reports indicating certificates that are created using the certificate authorities.

20 Claims, 15 Drawing Sheets

SYSTEMS FOR GENERATING AND MANAGING CERTIFICATE AUTHORITIES

CROSS-REFERENCE TO RELATED APPLICATION

This application claims priority to provisional application Ser. No. 62/865,809, filed on Jun. 24, 2019, the entire contents of which are hereby incorporated by reference

BACKGROUND

Devices, systems, and other computing resources use digital certificates for sharing public keys that can be used for encryption and authentication. To obtain digital certificates, an entity maintains a public key infrastructure that sets roles, policies, hardware, and software procedures required to create, manage, distribute, use, store, and revoke the digital certificates. The public key infrastructure may use third-party certificate authorities, such as registration authorities, that issue the digital certificates for the entity. These third-party certificate authorities must be trusted by both the entity that is issued the digital certificates and well as other entities that rely on the signatures of the digital certificates.

Managing the public key infrastructure requires a great amount of computing resources for the entity. Additionally, when the public key infrastructure uses third-party certificate authorities to generate the digital certificates, it can be difficult to manage for the entity. This is especially true when the public key infrastructure uses multiple certificate authorities, such as a hierarchy of certificate authorities that includes a root certificate authority, one or more intermediate (and/or subordinate) certificate authorities, and an issuing certificate authority.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
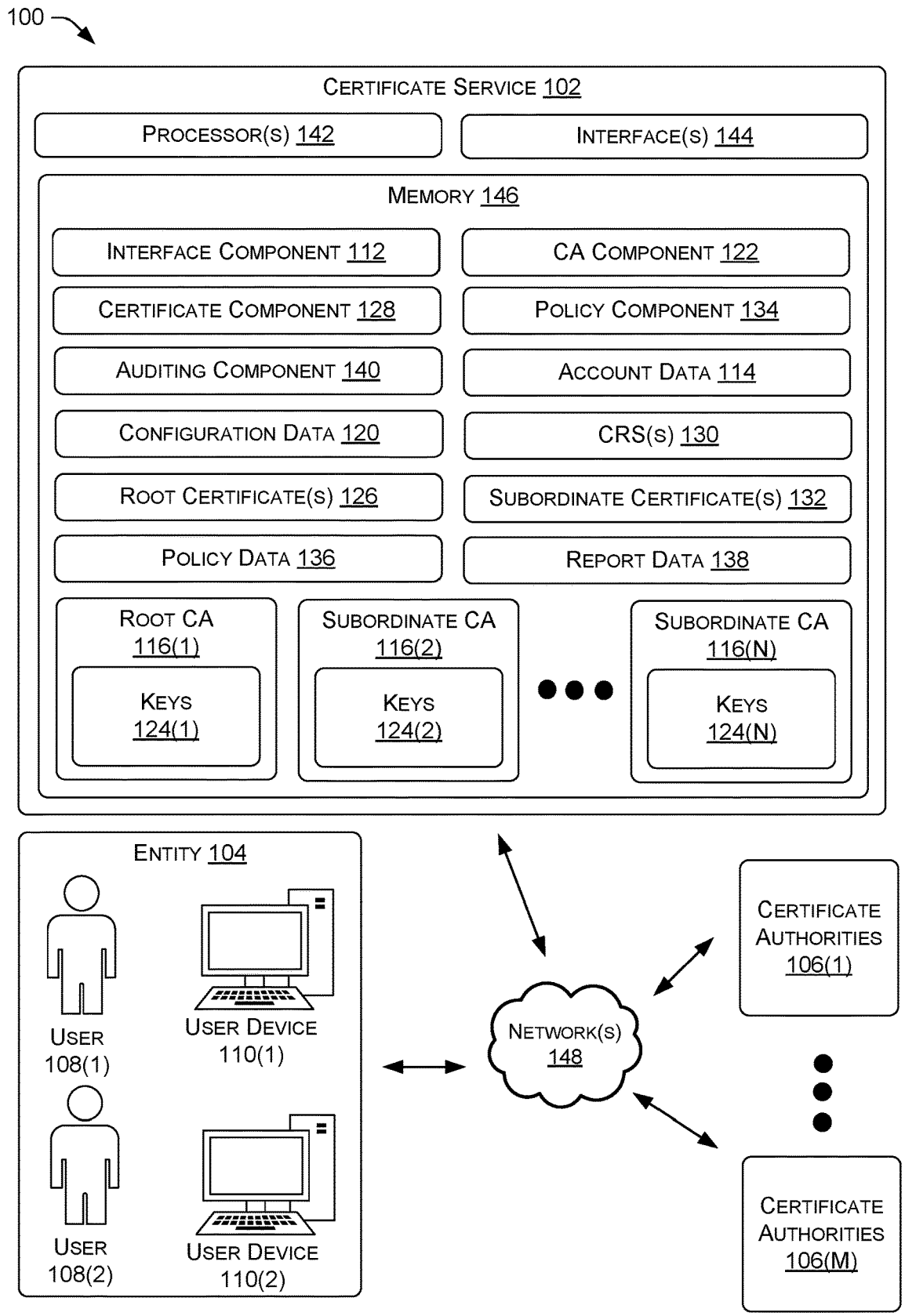
FIG. 1 illustrates an example environment for creating and managing certificate authorities, according to an embodiment of the present disclosure.

As discussed above, an entity, such as a business, company, corporation, and/or the like, may use digital certificates in order to secure devices, system(s), and other computing resources. However, managing a public key infrastructure requires a great amount of computing resources for the entity. Additionally, when the public key infrastructure uses third-party certificate authorities to generate the digital certificates, it can be difficult to manage for the entity. This is especially true when the public key infrastructure uses multiple certificate authorities, such as a hierarchy of certificate authorities that includes a root certificate authority, one or more subordinate (and/or intermediate) certificate authorities, and an issuing certificate authority. As such, it may be beneficial to many entities to provide system(s) that the entities can use to manage private certification authorities that are able to securely generate digital certificates.

Discussed herein, among other things, are system(s) and methods for generating and managing certificate authorities. For instance, an entity may use these system(s) to generate certificate authorities, such as root certificate authorities and subordinate certificate authorities (e.g., intermediate certificate authorities, issuing certificate authorities, etc.). After generating the certificate authorities, the entities may then use the certificate authorities to generate certificates that the entities use to secure computing resources, such as by providing encryption and authentication. Additionally, the system(s) may provide the entities with resources to secure their certificate authorities. For instance, the system(s) may allow the entities to set policies for generating, enabling, disabling, and revoking certificate authorities, as well as set policies for generating and revoking certificates issued using the certificate authorities. The system(s) may also provide the entities with audit reports that represents actions performed using the certificate authorities.

For more detail, the system(s) may provide one or more user interfaces that an entity uses to generate certificate authorities. For example, a user associated with an entity may use a user device to generate a certificate authority. For instance, to create a certificate authority, the user device may display a user interface that includes interface elements for inputting information associated with a certificate authority. The information may include, but is not limited to, a type of certificate authority, a subject name associated with the certificate authority, a key type associated with the certificate authority, one or more tags associated with the certificate authority, one or more policies associated with the certificate authority, and/or other any other type of information. The user interface may also allow the user to create a certificate revocation list associated with the certificate authority.

The type of certificate authority may include, but is not limited to, a root certificate authority, a subordinary certificate authority, and/or any other type of certificate authority. In some instances, a root certificate authority may include a certificate authority that includes a self-signed certificate and a subordinate certificate authority may include a certificate authority that includes a certificate signed by a parent certificate authority (e.g., root certificate authority, another subordinate certificate authority, etc.), which is discussed in more detail below. The subject name associated with the certificate authority may include, but is not limited to, an organization name, an organization unit name, a country name, a state or province name, a locality name, a common name, and/or any other type of identifier associated with the entity. In some instances, the user provides a single subject name to associate with the certificate authority while in other instances, the user provides more than one subject name to associate with the certificate authority.

The key type represents the type of algorithm that the system(s) use to generate the private key and/or public key for the certificate authority. For example, the key type may include, but is not limited to, a Rivest-Shamir-Adleman (RSA) 2048 algorithm, a RSA 4096 algorithm, an Elliptic Curve Digital Signature Algorithm (ECDSA) P256, an ECDSA P384, and/or any other type of algorithm that the system(s) may use to generate the keys for the certificate authority. The one or more tags may include key and/or value pairs that serve as metadata for identifying and organizing the certificate authority. For example, if the user creates more than one certificate authority, the user may use the tags associated with the certificate authorities as a way to organize the certificate authorities when later issuing certificates, which is described in more detail below.

The one or more policies may be associated with renewing certificates generated using the certificate authority at a time of expiration. For example, the user may set a policy that automatically renews end-entity certificates generated using the certificate authority. Finally, the user may create the certificate revocation list that is managed by the system(s). After creating the certificate revocation list, the user is able to add certificates to the certificate revocation list that the user wants to be revoked. Other entities that communicate with the devices of the entity may then use to the certificate revocation list to determine whether the certificates received from the devices are valid, revoked, or on hold.

After inputting the information, a user interface may provide the user with a configuration associated with the certificate authority. For example, the user interface may provide the information input by the user so that the user is able to review and confirm the information. While providing the configuration, the user device may receive an input indicating whether the user confirms that the configuration is correct. If the user confirms that the configuration is correct, then the system(s) may use the information to generate the certificate authority for the user. For example, the system(s) may generate a private key and a public key using the key type. After generating the keys, the system(s) may store the private key and the public key in association with the certificate authority. Additionally, the system(s) may then add the certificate authority to an account associated with the entity.

In some instances, after generating the certificate authority, the certificate authority may operate in a "pending" state until the user issues a certificate for the certificate authority. For example, after generating the certificate authority, the system(s) may provide the user with an option to then issue the certificate for the certificate authority. If the system(s) receive an indication that the user wants to issue the certificate at a later time, then the system(s) may set the state of the certificate authority to pending. The certificate authority may remain pending until the user later issues the certificate.

For instance, the system(s) may also provide one or more user interfaces that the user may use to issue certificates using the certificate authorities. For a first example, to issue a root certificate, the user device may display a user interface that includes interface elements for inputting information associated with the root certificate. The information may include, but is not limited to, a root certificate authority to use to issue the root certificate, a validity period for the root certificate, a signature algorithm, and/or other any other type of information. The validity period may indicate the length of time that the root certificate will be valid. In some instances, the length of time may be in years, months, days, and/or any other time period. The signature algorithm may specify what algorithm the root certificate will use when issuing new certificates.

After inputting the information, the user interface (and/or another user interface) may provide the user with a configuration associated with the root certificate. For instance, the user interface may provide the information input by the user so that the user is able to review and confirm the information. While providing the configuration, the user device may receive an input indicating whether the user confirms that the configuration is correct. If the user confirms that the configuration is correct, then the system(s) may use the information to issue the root certificate. For instance, the system(s) may generate a certificate signing request using the information, such as the subject name and/or validity period, associates with the root certificate authority and/or the root certificate. Since, this is for the root certificate, the certificate signing request may include the public key associated with the root certificate authority. The system(s) may then issue the root certificate using the certificate signing request, a root certificate template, and the private key associated with the root certificate authority. For instance, the system(s) may sign the certificate signing request using the private key. The system(s) may then store the root certificate and/or send the root certificate to the user device.

For a second example, to issue a subordinate certificate, the user device may again display a user interface that includes interface elements for inputting information associated with the subordinate certificate. The information may include, but is not limited to, a subordinate certificate authority to use to issue the subordinate certificate, a parent certificate authority (e.g., the root certificate authority, another subordinate certificate authority, etc.), a validity period for the subordinate certificate, a signature algorithm, a path length, a template, and/or other any other type of information.

The parent certificate authority may indicate which certificate authority is going to sign the subordinate certificate. The validity period may indicate the length of time that the subordinate certificate will be valid. As discussed above, in some instances, the length of time may be in years, months, days, and/or any other time period. The signature algorithm may specify what algorithm the subordinate certificate will use when issuing new certificates. Additionally, the path length may specify the number of trust layers that the subordinary certificate authority may add when signing new certificates. For instance, a path length of zero allows the subordinate certificate authority to only issue end-entity certificates. Additionally, a path length greater than zero allows the subordinate certificate authority to issue certificates in order to generate one or more additional subordinary certificate authorities within a hierarchy. In some instances, the path length is between zero and three. However, in other instances, the path length may be greater than three.

The template may indicate actions that may be performed using the subordinary certificate. For example, the system(s) may use a first template to issue certificates that are for code signing, a second template to issue certificates for end entities (e.g., operating system(s), web servers, etc.), a third template to issue subordinary certificates with a path length of zero, a fourth template to issue subordinate certificates with a path length of one, a fifth template to issue subordinate certificates with a path length of two, a sixth template to issue subordinate certificates with a path length of three, and/or any other template. In some instances, the template is selected based on the path length. For example, the system(s) and/or the user device may select the fifth template when the user selects a path length of two.

After inputting the information, a user interface may provide the user with a configuration associated with the subordinate certificate. For instance, the user interface may provide the information input by the user so that the user is able to review and confirm the information. While providing the configuration, the user device may receive an input indicating whether the user confirms that the configuration is correct. If the user confirms that the configuration is correct, then the system(s) may use the information to issue the subordinate certificate. For instance, the system(s) may generate a certificate signing request using the information, such as the subject name, the validity period, and/or the path length, associated with the selected subordinate certificate authority and/or the subordinate certificate. Since this is for the subordinate certificate, the certificate signing request may include the public key associated with the subordinate certificate authority. The system(s) may then issue the subordinate certificate using the certificate signing request, the selected template, and a certificate associated with the selected parent certificate authority. For instance, the system(s) may sign the certificate signing request using the public key from the selected parent certificate. The system(s) may then store the subordinate certificate and/or send the subordinate certificate to the user device.

It should be noted that, in some examples, the system(s) may allow the user to sign the subordinate certificate using an external certificate authority. In such examples, the user device may display a user interface that provides the certificate signing request generated by the system(s). The user may then use the user device to export the certificate signing request to a file and have the file signed by the external certificate authority. After getting the certificate signing request signed, which issues the subordinate certificate, the user may use the user device to import the subordinate certificate onto the system(s), where the system(s) then store the subordinate certificate in association with the subordinate certificate authority.

In some instances, the system(s) may allow the user to create policies associated with both certificate authorities and certificates. For example, the user may create policies indicating which users are able to create a certificate authority, enable a certificate authority, disable a certificate authority, update a certificate authority, tag a certificate authority, remove a tag for a certificate authority, delete a certificate authority, issue a certificate, retrieve a certificate, revoke a certificate, create an audit report, create policies, delete policies, and/or any other type of policy that may be created for certificate authorities and/or certificates. As such, the system(s) may use the policies when other users attempt to access the certificate authorities to perform one or more actions.

For example, the system(s) may receive, from another user device, credential (e.g., a username, a password, etc.) of an additional user associated with the entity. Using the credentials, the system(s) may identify the other user. The system(s) may then receive, from the other user device, a request to perform an action associated with a certificate authority, such as to issue a certificate using a certificate authority. Based on receiving the request, the system(s) may analyze the policies associated with the entity and/or the certificate authorities to determine if the other user is authorized to perform the action. If the system(s) determine that the other user is not authorized to perform the action, then the system(s) may refrain from performing the action. For instance, the system(s) may refrain from issuing the certificate using the certificate authority. However, if the system(s) determine that the other user is authorized to perform the action, then the system(s) may cause the action to be performed. For instance, the system(s) may issue the certificate using the certificate authority.

In some instances, the system(s) may generate and provide the user with audit reports. For example, the system(s) may generate an audit report associated with a certificate authority. The system(s) may then update the audit report when one or more actions are performed using the certificate authority. For instance, the system(s) may update the audit report to indicate that the certificate authority was enabled or disabled, indicate when a certificate was issued using the certificate authority, indicate when a subordinate certificate authority was created using the certificate authority, and/or to indicate any other type of action. In some instances, the system(s) may notify authorized users when an action was performed using the certificate authority by sending at least a portion of the audit report to the authorized users. Additionally, or alternatively, in some instances, the system(s) may provide the audit reports to the authorized users when receiving requests.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the system(s), and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for creating and managing certificate authorities, according to an embodiment of the present disclosure. As shown, the environment 100 includes at least a certificate service 102, an entity 104, and external certificate authorities 106(1)-(M) (also referred to as "external certificate authorities 106"). The entity 104 may correspond to a user, a business, company, corporation, and/or any other type of entity that includes one or more users that may access the certificate service 102. For example, and as illustrated in FIG. 1, the entity 104 may include at least a first user 108(1), a second user 108(2), a first user device 110(1) associated with the first user 108(1), and a second user device 110(2) associated with the second user 108(2). However, in other examples, the entity 104 may include any number of users and/or user devices. Additionally, in some examples, the entity 104 may include other computing resources, such as, but not limited to, servers, websites, applications, accounts (e.g., email accounts, banking accounts, etc.), and/or any other type of computing resources.

Initially, the user 108(1) may access the certificate service 102 to create a hierarchy of certificate authorities. To access the certificate service 102, an interface component 112 of the certificate service 102 may be configured to generate and provide a user interface for logging into an account associated with the user 108(1) and/or the entity 104, where the account may be represented by account data 114. For example, the user device 110(1) may display the user interface that the user 108(1) uses to input credentials associated with the account. The credentials may include, but are not limited to, a user name, a password, and/or any other type of information that the certificate service 102 may use to identify the account. After inputting the credentials, the certificate service 102 may receive the credential from the user device 110(1) and then use the credentials to authorize the user 108(1) for the account. For example, the certificate service 102 may match the received credentials to credentials that are stored in association with the account.

The certificate service 102 may then allow the user 108(1) to create certificate authorities 116(1)-(N) (also referred to as singularly as a "certificate authority 116" or plurally as "certificate authorities 116") for the account. In some instances, the certificate authorities 116 include at least a root certificate authority 116(1) and one or more subordinate certificate authorities 116(2)-(N) (e.g., intermediate certificate authorities, issuing certificate authorities, etc.). To create a certificate authority 116, the interface component 112 of the certificate service 102 may be configured to generate and then provide the user device 110(1) with one or more user interfaces for inputting information associated with the certificate authority 116. The information may include, but is not limited to, a type of certificate authority, a subject name associated with the certificate authority 116, a key type associated with the certificate authority 116, one or more tags associated with the certificate authority 116, one or more policies associated with the certificate authority 116, and/or any other type of information. Additionally, in some instances, the user interface may also allow the user to create a certificate revocation list 118 associated with the certificate authority 116.

The type of certificate authority may include, but is not limited to, the root certificate authority 116(1), the subordinary certificate authority 116(2)-(N), and/or any other type of certificate authority 116. When creating a subordinate certificate authority 116(2)-(M), the user interface may also allow the user to select a parent certificate authority, such as the root certificate authority 116(1) and/or other subordinate certificate authority 116(2)-(M), to associate with the subordinary certificate authority 116(2)-(M). The subject name associated with the certificate authority 116 may include, but is not limited to, an organization name, an organization unit name, a country name, a state or province name, a locality name, a common name, and/or any other type of identifier associated with the entity 104. In some instances, the user 108(1) provides a single subject name for the certificate authority 116 while in other instances, the user 108(2) provides more than one subject name to associate with the certificate authority 116.

The key type may represent the type of algorithm used to generate the private key and/or public key that will be associated with the certificate authority. As discussed above, the key type may include, but is not limited to, a RSA 2048 algorithm, a RSA 4096 algorithm, an ECDSA P256, an ECDSA P384, and/or any other type of algorithm that may be used to generate the keys for the certificate authority. The one or more tags may include key and/or value pairs that serve as metadata for identifying and organizing the certificate authority 116. For example, if the user 108(1) creates more than one certificate authority 116, the user 108(1) may use the tags associated with the certificate authorities 116 as a way to organize the certificate authorities 116 when later issuing certificates.

The one or more policies may be associated with renewing certificates generated using the certificate authority 116 at a time of expiration. For example, the user 108(1) may set a policy that automatically renews end-entity certificates generated using the certificate authority 116. Finally, the user 108(1) may create the certificate revocation list 118 that is managed by the certificate service 102. This way, the user 108(1) is able to later add certificates to the certificate revocation list 118 that the user wants revoked. Other entities that communicate with the user devices 110(1)-(2) of the entity 104 may then use to the certificate revocation list 118 to determine whether the certificates received from the user device 110(1)-(2) are valid, revoked, or on hold.

After inputting the information, the user device 110(1) may provide a user interface that includes a configuration associated with the certificate authority 116. For example, the user interface may provide the information input by the user 108(1) so that the user 108(1) is able to review and confirm the information. While providing the configuration, the user device 110(1) may receive an input indicating whether the user confirms that the configuration is correct. If the user 108(1) does not confirm that the configuration is correct, then the user device 110(1) may provide the user 108(1) with options for updating the information. However, if the user 108(1) does confirm the configuration is correct, then the user device 110(1) may generate configuration data 120 representing the inputted information for the certificate authority 116. The user device 110(1) may then send the configuration data 120 to the certificate service 102.

Using the configuration data 120, the certificate service 102 may create the certificate authority 116 for the user 108(1) and/or the account. For example, a certificate authority component 122 of the certificate service 102 may use the configuration data 120 to generate data representing the certificate authority 116. The data may include at least a portion of the information input by the user 108(1), such as the subject name. The certificate authority component 122 may also use the key type from the configuration data 120 to generate a private key and a public key for the certificate authority 116. For example, and as illustrated in FIG. 1, each of the certificate authorities 116 may be associated with respective keys 124(1)-(N) (also referred to as "keys 124"), where the keys 124 for a certificate authority 116 include both the private key and the public key. The certificate authority component 122 may then store the generated certificate authority 116 in association with the account of the entity 104.

In some instances, when generating a subordinate certificate authority 116(2)-(N), the certificate authority component 122 may also associate the subordinate certificate authority 116(2)-(N) with a parent certificate authority 116. For example, if the root certificate authority 116(1) includes the parent certificate authority for the subordinate certificate authority 116(2), then the certificate authority component 122 may store data that associates the root certificate authority 116(1) with the subordinate certificate authority 116(2). This data may then be used when creating certificate hierarchies, which is described below.

In some instances, such as for security purposes, the certificate service 102 may store the keys 124 (e.g., the private keys) in secure memory. For example, the certificate service 102 may store the keys 124 on a hardware security module (HSM) that provides additional security for the keys 124. In some instances, the certificate service 102 may only access the keys 124 stored in the HSM when using the keys 124 to issue new certificates. This may prevent authorized use and/or retrieval of the keys by unauthorized users.

The certificate service 102 may also provide one or more user interfaces that the user 108(1) (and/or any other authorized user) may use to issue certificates using the certificate authorities 116. For example, to issue a root certificate 126, the user device 110(1) may display a user interface that includes interface elements for inputting information associated with the root certificate 126. The information may include, but is not limited to, the root certificate authority 116(1) to use to issue the root certificate 126, a validity period for the root certificate 126, a signature algorithm, and/or other any other type of information. As discussed above, the validity period may indicate the length of time that the root certificate 124 will be valid. The signature algorithm may specify what algorithm the root certificate authority 116(1) will use when issuing new certificates.

After inputting the information, the user device 110(1) may provide a user interface that includes a configuration associated with the root certificate 124. For instance, the user interface may provide the information input by the user 108(1) so that the user 108(1) is able to review and confirm the information. While providing the configuration, the user device 110(1) may receive an input indicating whether the user 108(1) confirms that the configuration is correct. If the user 108(1) does not confirm that the configuration is correct, then the user device 110(1) may provide the user 108(1) with options for updating the information. However, if the user 108(1) does confirm that the configuration is correct, then the user device 110(1) may generate configuration data 120 representing the inputted information for the root certificate 126. The user device 110(1) may then send the configuration data 120 to the certificate service 102.

The certificate service 102 may generate the root certificate 126 using the information included in the configuration data 120. To generate the root certificate 126, a certificate component 128 of the certificate service 102 may generate a certificate signing request 130 using the information, such as the subject name and the validity period, associated with the root certificate authority 116(1) and/or the root certificate 126. Since, this is for the root certificate 126, the certificate signing request 130 may include the public key 124(1) associated with the root certificate authority 116(1). The certificate component 128 may then issue the root certificate 126 using the certificate signing request 130, a root certificate template, and the private key 124(1) associated with the root certificate authority 116(1). For instance, the certificate component 128 may sign the certificate signing request 130 using the private key 124(1). The certificate component 128 may then cause the certificate service 102 to store the root certificate 126 and/or cause the root certificate 126 to be sent to the user device 110(1).

As such, the certificate service 102 provides the user 108(1) with the ability to generate the root certificate authority 116(1) and then use the root certificate authority 116(1) to generate root certificate(s) 126. The root certificate(s) 126 may include an initial certificate in a certificate hierarchy. In some instances, the certificate service 102 switches the root certificate authority 116(1) from a "pending" state to an "enabled" state after the root certificate 126 is issued. In other instances, and in order to secure the root certificate authority 116(1), the certificate service 102 switches the root certificate authority 116(1) from the "pending" state to a "disabled" state after the root certificate is issued.

The certificate service 102 may also provide the user 108(1) with the ability to generate subordinate certificate(s) 132. For example, to issue a subordinate certificate 132 included in the certificate hierarchy, the user device 110(1) may display a user interface that includes interface elements for inputting information associated with the subordinate certificate 132. The information may include, but is not limited to, the subordinate certificate authority 116(2) to use to issue the subordinate certificate 132, a parent certificate authority 116 (e.g., the root certificate authority 116(1)) to sign the subordinate certificate 132, a validity period of the subordinate certificate 132, a signature algorithm, a path length, a template, and/or other any other type of information.

The parent certificate authority 116 may indicate which certificate authority 116 is going to sign the subordinate certificate 132. For example, and in the example of FIG. 1, if the user 108(1) is issuing the subordinate certificate 132 using the subordinate certificate authority 116(2), then the parent certificate authority 116 may include the root certificate authority 116(1). As discussed above, the validity period may indicate the length of time that the subordinate certificate will be valid. The signature algorithm may specify what algorithm the subordinate certificate authority 116(1) will use when issuing new certificates. Additionally, the path length may specify the number of trust layers that the subordinary certificate authority 116(2) may add when signing new certificates. For instance, a path length of zero means that only end-entity certificates may be issued by the subordinate certificate authority 116(2). Additionally, a path length greater than zero means that the subordinate certificate authority 116(2) may issue certificates in order to generate one or more additional subordinary certificate authorities 116(N) within the hierarchy. In some instances, the path length is between zero and three. However, in other instances, the path length may be greater than three.

As described herein, templates may correspond to blueprints for certificates, where the templates specify the basic structures for what information is included within the certificates. In some instances, a template may indicate actions that may be performed using the subordinary certificate 116(2). For example, a first template may be used to issue certificates that are for code signing, a second template may be used to issue certificates for end entities (e.g., operating systems, web servers, etc.), a third template may be used to issue subordinary certificates 132 with a path length of zero, a fourth template may be used to issue subordinate certificates 132 with a path length of one, a fifth template may be used to issue subordinate certificates 132 with a path length of two, a sixth template may be used to issue subordinate certificates 132 with a path length of three, and/or any other template. In some instances, the template is selected based on the path length. For example, the fifth template may be selected when the user indicates a path length of two.

After inputting the information, the user device 110(1) may provide a user interface that includes a configuration associated with the subordinate certificate 132. For instance, the user interface may provide the information input by the user 108(1) so that the user 108(1) is able to review and confirm the information. While providing the configuration, the user device 110(1) may receive an input indicating whether the user 108(1) confirms that the configuration is correct. If the user 108(1) does not confirm that the configuration is correct, then the user device 110(1) may provide the user 108(1) with options for updating the information. However, if the user 108(1) does confirm that the configuration is correct, then the user device 110(1) may generate configuration data 120 representing the inputted information for the subordinate certificate 132. The user device 110(1) may then send the configuration data 120 to the certificate service 102.

The certificate service 102 may use the information included in the configuration data 120 to generate the subordinate certificate 132. For instance, the certificate component 128 of the certificate service 102 may generate a certificate signing request 130 using the information, such as the subject name, the validity period, and the path length, associated with the selected subordinate certificate authority 116(2) and/or the subordinate certificate 132. Since this is for the subordinate certificate 132, the certificate signing request 130 may include the public key 124(2) associated with the subordinate certificate authority 116(2). The certificate signing request 130 may also be signed using the private key 124(2) associated with the subordinate certificate authority 116(2). In some instances, the certificate component 128 may then issue the subordinate certificate 132 using the certificate signing request 130, the selected template, and a certificate associated with the selected parent certificate authority 116. For example, if the selected parent certificate authority 116 includes the root certificate authority 116(1), the certificate component 128 may sign the certificate signing request 130 using the private key 124(1) from the root certificate 126. The certificate component 128 may then store the subordinate certificate 132 and/or cause the subordinate certificate 132 to be sent to the user device 110(1).

Additionally to, or alternatively from, the certificate component 128 issuing the subordinate certificate 132 using a local certificate authority 116, in other examples, the user 108(1) may use an external certificate authority 106 to issue the subordinate certificate 132. For example, after generating the certificate signing request 130, the user device 110(1) may provide a user interface that includes at least a portion of the certificate information as well as information that allows the user 108(1) to export the certificate signing request 130 to a file. The user 108(1) may then use the user device 110(1) to sign the certificate signing request 130 using one or more of the external certificate authorities 106. For example, the user device 110(1) may send the certificate signing request 130 to the external certificate authority 106(1) for signing. After the external certificate authority 106(1) signs the certificate signing request 130 in order to generate the subordinate certificate 132, the user device 110(1) may retrieve the subordinate certificate 132 from the certificate authority 106(1).

The user device 110(1) may then provide a user interface that the user 108(1) may use to import the subordinate certificate 132. Once imported, the certificate service 102 may store the subordinate certificate 132 in association with the subordinate certificate authority 116(2). This way, the user 108(1) is able to generate certificates (e.g., root certificates 126, subordinate certificates 132, etc.) using both the local certificate authorities 116 as well as the external certificate authorities 106.

In some instances, the user 108(1) may perform similar processes to generate one or more additional certificate authorities 116 and/or one or more additional certificates. For example, the user 108(1) may create a certificate hierarchy that includes at least the root certificate 126, one or more of the subordinate certificates 132, and/or an end-entity certificate (which may also be represented as a subordinate certificate 132). These certificates may then be distributed to one or more trust stores associated with the entity 104. This way, the entity 104 can use the certificates for both encryption and authentication, such as when communicating with one or more internal and/or external computing resources.

As further illustrated in the example of FIG. 1, the certificate service 102 may provide the entity 104 with security for the certificate authorities 116 and/or the certificates. For example, the interface component 112 of the certificate service 102 may generate and then provide one or more user interfaces for inputting policies associated with the account of the entity 104. As discussed herein, policies may indicate which users are able to create a certificate authority 116, enable a certificate authority 116, disable a certificate authority 116, update a certificate authority 116, tag a certificate authority 116, remove a tag for a certificate authority 116, delete a certificate authority 116, issue a certificate, retrieve a certificate, revoke a certificate, create an audit report, create policies, delete policies, and/or any other type of policy that may be created for certificate authorities 116 and/or certificates. As such, the user 108(1) may use the one or more user interfaces, provided by the user device 110(1), to input the policies associated with the entity 104.

For a first example, the user 108(1) may create first policy that indicates that the user 108(1) is able to create new certificate authorities 116 and a second policy that indicates that the user 108(2) is not able to create new certificate authorities 116. For a second example, the user 108(1) may create a first policy that indicates that only the user 108(1) is able to enable and disable a certificate authority 116 (which is described in more detail below) and create a second policy that indicates that the user 108(2) is only able to issue certificates when the certificate authority 116 when enabled. However, since the first policy indicates that only the user 108(1) is able to enable the certificate authority 116, the user 108(2) may not have permission to enable the certificate authority 116 and as such, the user 108(2) may be unable to issue certificates using the certificate authority 116 until the certificate authority 116 is enabled by the user 108(1).

After inputting the policies, the user device 110(1) may generate policy data 136 representing the policies and send the policy data to the certificate service 102. A policy component 134 of the certificate service 102 may then cause the policy data 136 to be stored in association with the account of the entity 104. This way, the entity 104 is able to secure both the certificate authorities 116 as well as the certificates that are generated using the certificate authorities 116. For example, the user 108(1) may be able to disable certificates authorities 116, such as the root certificate authority 116(1), when such certificate authorities 116 should not be issuing certificates for the entity 104. Additionally, only an authorized user, such as the user 108(1), may have permission to once again enable the certificate authorities 116 for generating certificates. As such, unauthorized users associated with the entity 104 (as well as unauthorized users outside of the entity 104) are unable to generate certificates without authorized permission.

As further illustrated in the example of FIG. 1, the certificate service 102 may provide audit reports to the entity 104, where the audit reports are represented by report data 138. For example, an auditing component 140 may be configured to generate an audit report for a certificate authority 116, such as the root certificate authority 116(1). The auditing component 140 may then be configured to update the audit report when one or more actions are performed with respect to the certificate authority 116. For a first example, the auditing component 140 may be configured to update the audio report to indicate that the certificate authority 116 was created, enabled, updated, disabled, and/or removed. For a second example, the auditing component 140 may be configured to update the audio report to indicate that the certificate authority 116 was used to generate one or more certificates. Still, for a third example, the auditing component 140 may be configured to update the audit report to indicates that one or more certificates associated with the certificate authority 116 were revoked. While these are just a few examples of actions that the auditing component 140 may use to update the audit report, in other examples, the auditing component 140 may update the audit report for additional and/or alternative actions.

In some instances, the auditing component 140 updates the audit report by adding data (e.g., an entry) that indicates information about a specific action. For example, and for an action, the auditing component 140 may update the audit report to indicate at least an identifier (e.g., name, username, etc.) of the user that initiated the action, the action that was initiated, the time the action was initiated, whether the action was approved/disapproved, the results of the action (e.g., whether a certificate authority 116 generate a certificate), and/or any other type of data. In some instances, the certificate service 102 may notify authorized users about updates to the audit report each time the auditing component 140 updates the audit report. For example, the certificate service 102 may send a notification about the action and/or the report data 138 to the user device 110(1) associated with the user 108(1). Additionally, or alternatively, in some instances, the certificate service 102 may send the report data 138 to authorized users in response to receiving a request for the audit report.

Although the above examples describe generating and updating an audit report for a single certificate authority 116, in other examples, the certificate service 102 may generate an audit report that is associated with more than one certificate authority 116. Additionally, in some examples, the certificate service 102 may generate audit reports for more than one certificate authority 116 associated with the entity 104. This way, the authorized users associated with the entity 104, such as the user 108(1), are able to monitor the use of their personal certificate authorities 116. This may also help increase the security of the certificate authorities 116, as the authorized users are able to use the audit reports to quickly determine each of the actions that are performed using the certificate authorities 116 and also determine if one or more of those actions are unauthorized.

As further illustrated in the example of FIG. 1, the certificate service 102 may include processor(s) 142, network interface(s) 144, and memory 146. As used herein, a processor, such as the processor(s) 142, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more systems.

Memory, such as the memory 146, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 144, may enable data to be sent between devices via network(s) 148. For example, the network interface(s) may enable data to be sent between the certificate service 102, the user devices 110 of the entity 104, and/or with one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

It should be noted that, although the example of FIG. 1 illustrates a single entity 104 using the certificate service 102 in order to generate and manage certificate authorities 116, in other examples, more than one entity may use the certificate service 102 to generate and manage certificate authorities 116. Additionally, in some examples, the certificate service 102 may allow the entity 104 to generate more than one certificate authority hierarchy, where the entity 104 may use different certificate authority hierarchies for generate certificates. For example, the entity 104 may generate different certificate authority hierarchies in order to generate certificates that are specific to various computing resources (e.g., devices, servers, systems, websites, email, etc.) of the entity 104.

Additionally, the certificate service 102 may use application programming interfaces (APIs) and/or command line interfaces (CLIs) when allowing users and/or entities to perform the processes described herein. For example, to crate the root certificate 126 using APIs, the certificate service 102 may use a set of API calls that include at least a "CreateCertificateAuthorty with CAType=Root, GetCertificateAuthorityCSR, IssueCertificate with TemplateARN=RootCATemplate/V1, GetCertificate, and ImportCertificateAuthorityCertificate. The certificate service 102 may use additional APIs to provide user interfaces to user devices, receive information from the user devices, create the certificate authorities 116, issue certificates using the certificate authorities 116, create policies associated with certificate authorities and/or certificates, create audit reports, and/or to perform any other processes described herein.

Figure 2:
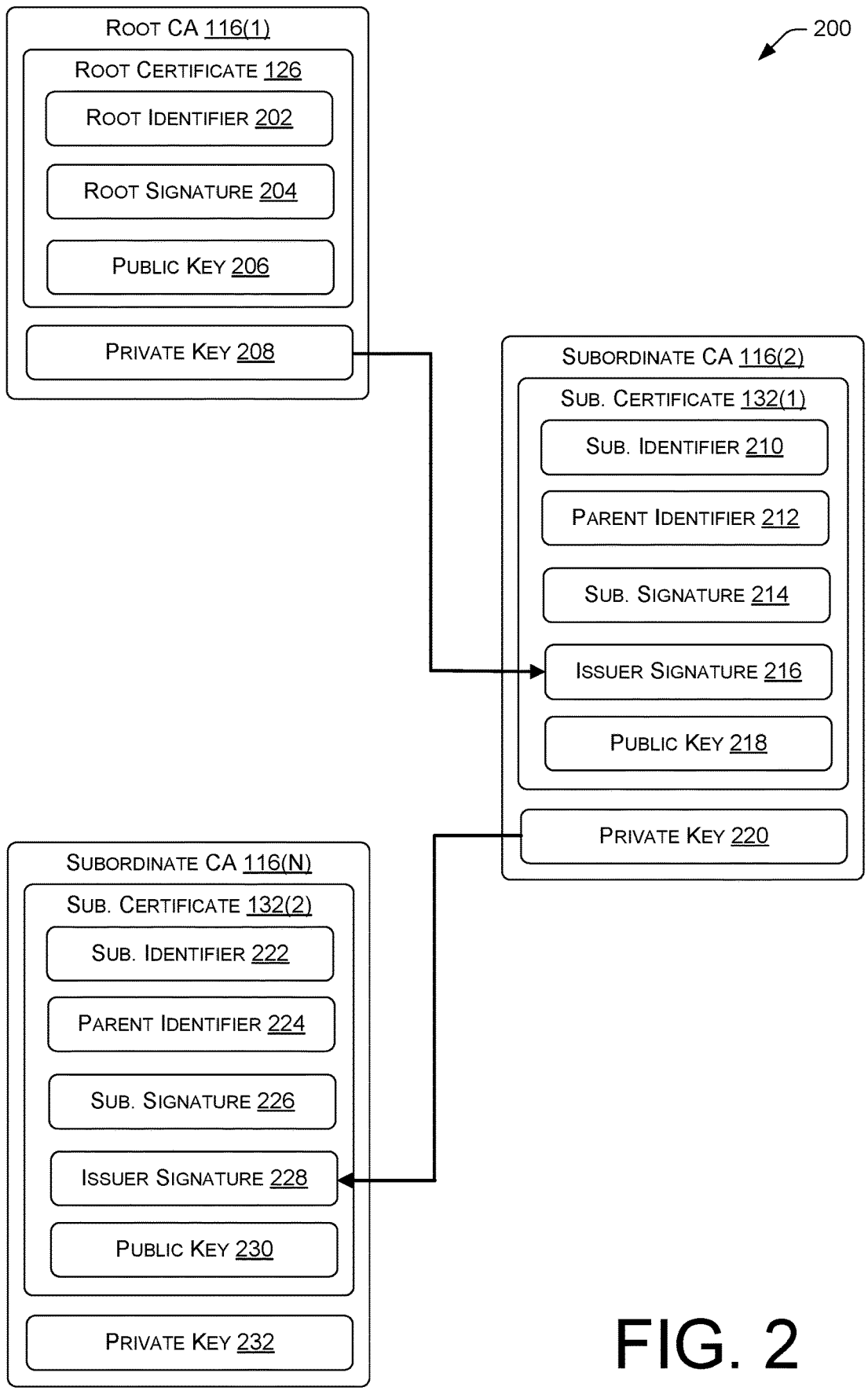
FIG. 2 illustrates an example of creating a certificate hierarchy using certificate authorities, according to an embodiment of the present disclosure.

FIG. 2 illustrates an example of creating a certificate hierarchy 200 using certificate authorities, according to an embodiment of the present disclosure. As shown, the certificate hierarchy 200 is created using the root certificate authority 116(1), the subordinate certificate authority 116(2), and the subordinate certificate authority 116(N). However, in other examples, a certificate hierarchy may include more of less certificate authorities 116. Additionally, in other examples, more than one subordinate certificate authority 116 may use the root certificate authority 116(1) as a parent certificate authority for issuing subordinate certificates 132. For example, the same root certificate authority 116(1) (and/or one or more of the subordinate certificate authorities 116) may be used to issue new certificate hierarchies.

As shown, the certificate service 102 may initially use the root certificate authority 116(1) to issue the root certificate 126. As shown, the root certificate 126 may include at least a root identifier 202, a root signature 204, and a public key 206 (which may represent one of the keys 124(1)) associated with the root certificate authority 116(1). In some instances, the root identifier 202 may include at least a portion of the subject name that the user 108(1) input when creating the root certificate authority 116(1). Additionally, the root signature 204 may include a signature that is created using a private key 208 (which may represent one of the keys 124(1)) of the root certificate authority 116(1). For instance, since this is the root certificate 126, the root certificate 126 may be self-signed by the root certificate authority 116(1). After issuing the root certificate 126, the certificate service 102 may send the root certificate 126 to the user device 110(1) and/or use the root certificate 126 to issue additional certificates included in the certificate hierarchy 200.

For example, the certificate service 102 may use the subordinate certificate authority 116(2) to issue a subordinate certificate 132(1). As shown, the subordinate certificate 132(1) may include at least a subordinate identifier 210, a parent identifier 212, a subordinate signature 214, a root signature 216, and a public key 218 (which may represent one of the keys 124(2)). In some instances, the subordinate identifier 210 may include at least a portion of the subject name that the user 108(1) input when creating the subordinate certificate authority 116(2). The parent identifier 212 may include an identifier that references the root certificate 126 that the certificate service 102 uses to issue the subordinate certificate 132(1) and/or an identifier that references the root certificate authority 116(1). Additionally, the subordinate signature 214 may include a signature that is generated using a private key 220 (which may represent one of the keys 124(2)) of the subordinate certificate authority 116(2). Furthermore, the issuer signature 216 may include a signature that is generated using the private key 208 of the root certificate authority 116(1). After issuing the subordinate certificate 132(1), the certificate service 102 may send the subordinate certificate 132(1) to the user device 110(1) and/or use the subordinate certificate 132(1) to issue additional certificates included in the certificate hierarchy 200.

For example, the certificate service 102 may use the subordinate certificate authority 116(N) to issue a subordinate certificate 132(2). As shown, the subordinate certificate 132(2) may include at least a subordinate identifier 222, a parent identifier 224, a subordinate signature 226, an issuer signature 228, and a public key 230 (which may represent one of the keys 124(N)). In some instances, the subordinate identifier 222 may include at least a portion of the subject name that the user 108(1) input when creating the subordinate certificate authority 116(N). The parent identifier 212 may include an identifier that references the subordinate certificate 132(1) that the certificate service 102 uses to issue the subordinate certificate 132(2) and/or an identifier that references the subordinate certificate authority 116(2). Additionally, the subordinate signature 226 may include a signature that is generated using a private key 232 (which may represent one of the keys 124(N)) of the subordinate certificate authority 116(N). Furthermore, the issuer signature 228 may include a signature that is generated using the private key 220 of the subordinate certificate authority 116(2). After issuing the subordinate certificate 132(2), the certificate service 102 may send the subordinate certificate 132(2) to the user device 110(1).

In some instances, the subordinate certificate 132(2) may include an end-entity certificate associated with the certificate hierarchy 200. The certificate hierarchy 200 may then be used for authentication associated with one or more computing resources of the entity 104.

Figure 3A:
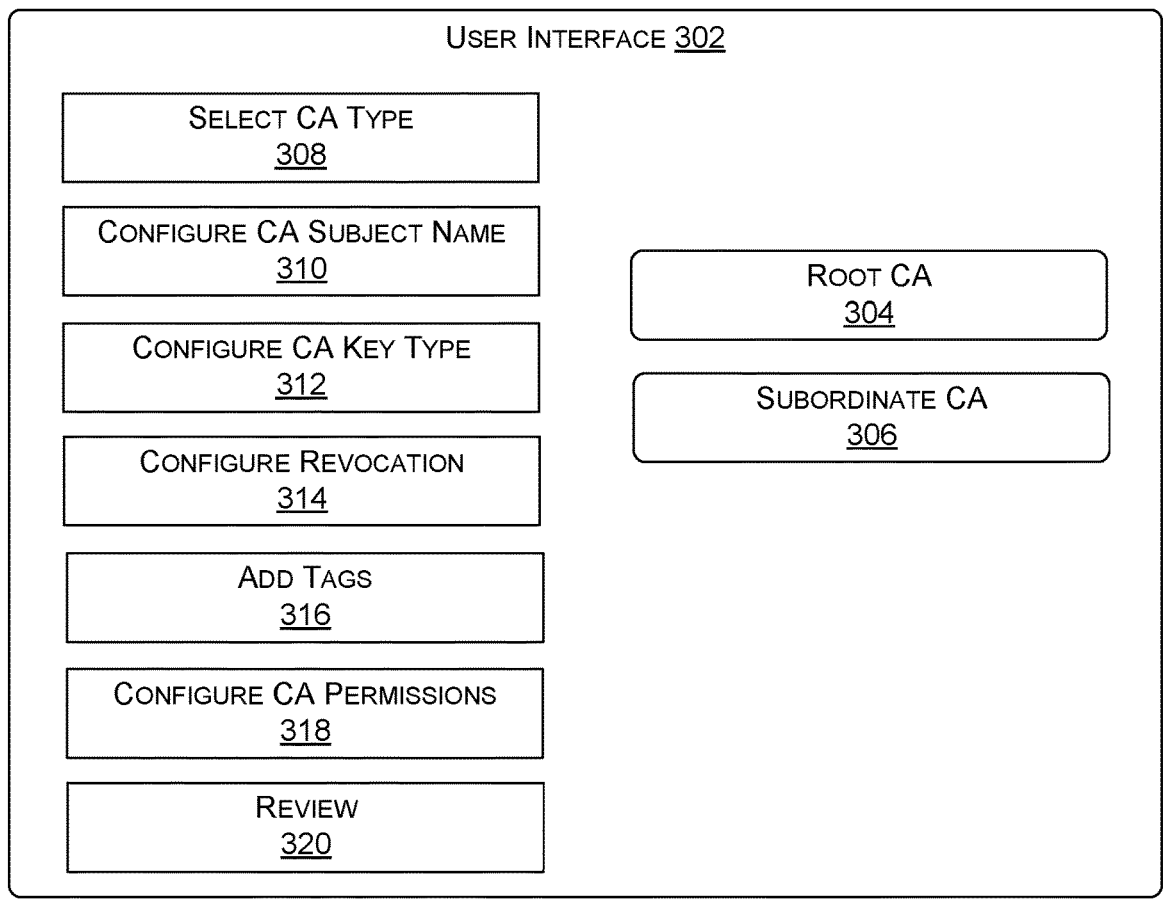
FIGS. 3A-3B illustrate example user interfaces that a user may use to create certificate authorities and certificates, according to an embodiment of the present disclosure.
Figure 3B:
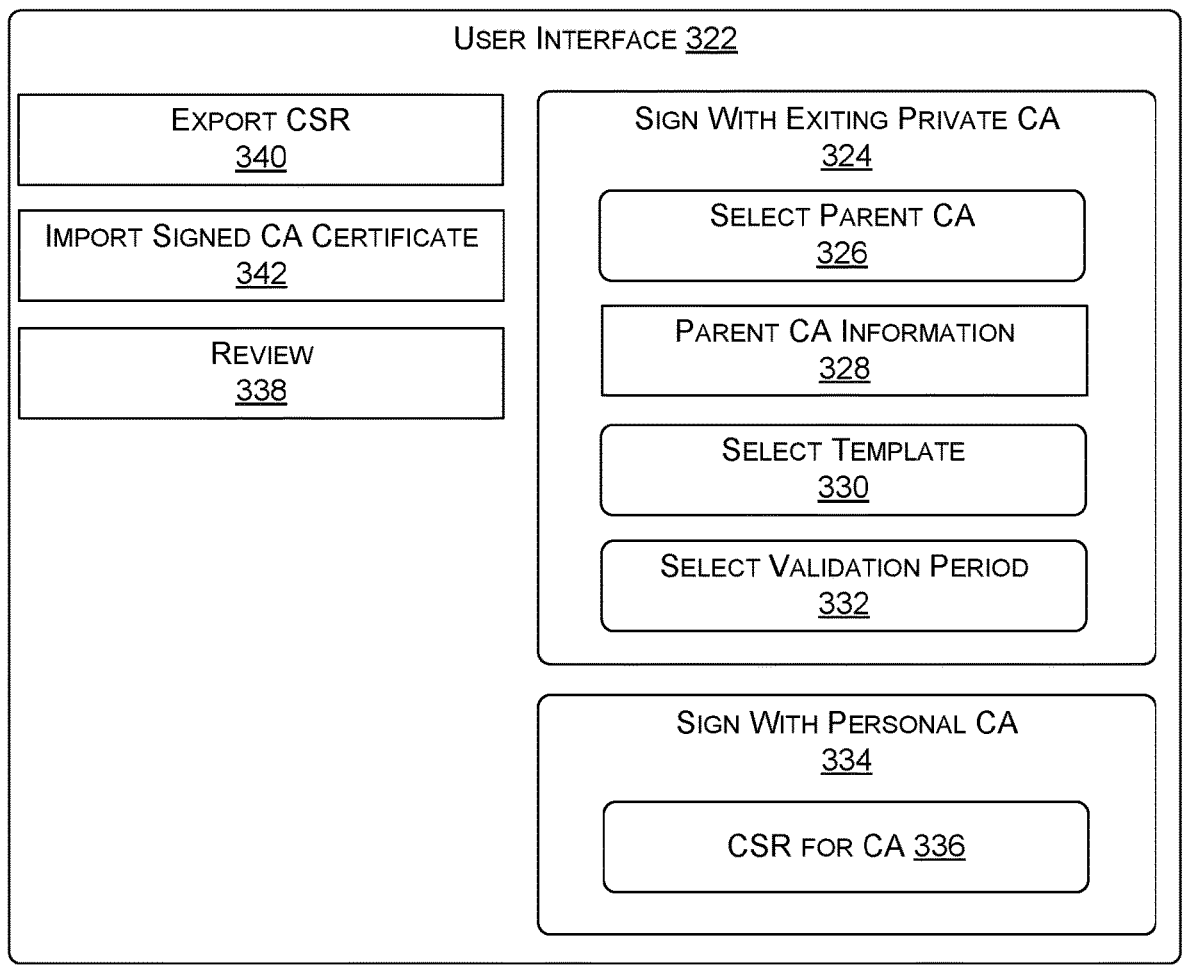

FIGS. 3A-3B illustrate example user interfaces that a user may use to create certificate authorities and certificates, according to an embodiment of the present disclosure. For instance, and as shown in the example of FIG. 3A, a user device (e.g., the user device 110(1)) may provide a user interface 302 for creating a certificate authority. As shown, the right portion of the user interface 302 includes at least a first interface element 304 for creating a root certificate authority (e.g., the root certificate authority 116(1)) and a second interface element 306 for creating a subordinate certificate authority (e.g., the subordinate certificate authority 116(2)). Additionally, a left portion of the user interface 302 includes a list of information that will be input by the user in order to create the selected type of certificate authority.

For example, and as shown, the user interface 302 (and/or one or more other user interfaces) may allow the user to input the subject name 310, input the key type 312, input the revocation 314 (e.g., the validity period), input one or more tags 316, input one or more permissions (e.g., one or more policies), and review 320 the inputted information. In some instances, the user device provides a different user interface for inputting each type of information. In other instances, the user device uses the same user interface for inputting two or more of the types of information. In either of the instances, after reviewing and confirming the information, the certificate service 102 may use the inputted information to create the selected type of certificate authority.

As described herein, an interface element may include, but is not limited to, an input interface (e.g., a button, a selectable list, a scroll bar, etc.), content (e.g., a logo, a name, a picture, etc.), and/or any other type of element that may be included on a user interface.

As shown in the example of FIG. 3B, the user device may provide a user interface 322 for issuing a certificate. As shown, a right portion of the user interface 322 includes a first interface element 324 for inputting information for issuing a certificate using an internal certificate authority. For example, the first interface element 324 includes at least a second interface element 326 for selecting a parent certificate authority, a third interface element 328 for inputting information associated with the parent certificate authority, a fourth interface element 330 for selecting a template, and a fifth interface element 332 for inputting the validation period. In some instances, after inputting the information, the user device may receive an input selecting a seventh interface element 338 associated with reviewing the inputted information. For instance, after receiving the input, the user device may then provide a user interface (either the user interface 322 and/or another user interface) that includes the information associated with the user. After the user confirms the information, the certificate service 102 may use the inputted information, as well as both the certificate authority and the parent certificate authority, to issue the certificate for the user. Additionally, the certificate service 102 may send the certificate to the user device.

The right portion of the user interface 322 may also include a sixth interface element 334 for issuing the certificate using an external certificate authority (e.g., one of the external certificate authorities 106). For instance, after generating the certificate signing request for the certificate using the information associated with the internal certificate authority, the certificate service 102 may send the certificate singing request to the user device, which the user device may provide to the user using a seventh interface element 336. While providing the certificate signing request, the user device may export the certificate signing request to a file. The user device may then use an external certificate authority to sign the certificate signing request in order to generate the certificate. After generating the certificate, the user device may import the certificate to the certificate service 102.

For example, the left portion of the user interface 322 includes a list of actions that may be performed to issue the certificate. For instance, the user interface 322 may include an eighth interface element 340 associated with exporting the certificate signing request. Once the certificate is generated, the user device may receive an input selecting a ninth interface element 342 associated with importing the certificate. For instance, after receiving the input, the user device may then provide a user interface (either the user interface 322 and/or another user interface) that includes an interface element for importing the certificate to the certificate service 102.

FIGS. 4-11 illustrate various processes related to generating and managing certificate authorities. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIG. 1, although the processes may be implemented in a wide variety of other environments, architectures, and systems.

Figure 4:
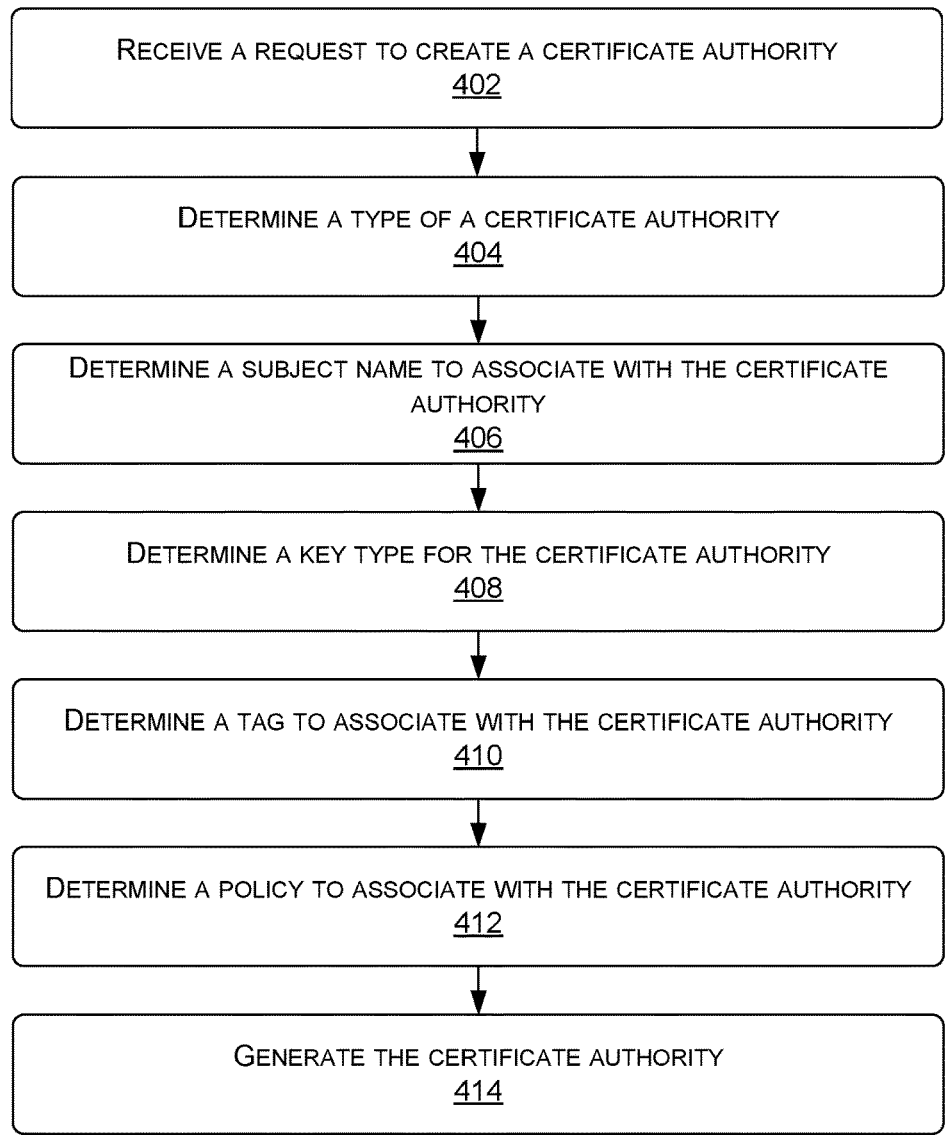
FIG. 4 illustrates an example process for creating a certificate authority, according to an embodiment of the present disclosure.

FIG. 4 illustrates an example process 400 for creating a certificate authority, according to an embodiment of the present disclosure. At 402, the process 400 may include receiving a request to create a certificate authority and at 404, the process 400 may determining a type of certificate authority. For instance, the certificate service 102 may receive, from the user device 110(1), the request to create the certificate authority. The certificate service 102 may then provide, to the user device 110(1), one or more user interfaces for creating certificate authorities. While providing a user interface, the certificate service 102 may receive, from the user device 110(1), a first indication of the type of certificate authority. As described herein, the type of certificate authority may include, but is not limited to, a root certificate authority, a subordinate certificate authority (which may also include an intermediate certificate authority and an issuing certificate authority), and/or any other type of certificate authority.

At 406, the process 400 may include determining a subject name to associate with the certificate authority and at 408, the process 400 may include determining a key type for the certificate authority. For instance, the certificate service 102 may receive, from the user device 110(1), a second indication of the subject name and a third indication of the key type. As discussed above, the subject name to associate with the certificate authority may include, but is not limited to, an organization name, an organization unit name, a country name, a state or province name, a locality name, a common name, and/or any other type of identifier associated with the entity. Additionally, the key type may be associated with the type of algorithm used to generate the private key and/or the public key that will be associated with the certificate authority.

At 410, the process 400 may include determining a tag to associate with the certificate authority and at 412, the process 400 may include determining a policy to associate with the certificate authority. For instance, the certificate service 102 may receive, from the user device 110(1), a fourth indication of the tag and a fifth indication of the policy. As discussed above, the tag may include key and/or value pairs that serve as metadata for identifying and organizing the certificate authority. Additionally, the policy may be associated with renewing certificates generated using the certificate authority at a time of expiration. For example, the user may set a policy that automatically renews end-entity certificates generated using the certificate authority.

At 414, the process 400 may include generating the certificate authority. For instance, the certificate service 102 may generate the certificate authority using the inputting information from 404-412. For example, the certificate authority may include the type of certificate. The certificate authority may also be associated with the subject name, the tag, and the policy. Additionally, the certificate service 102 may generate the private key and the public key for the certificate authority using the key type. After generating the certificate authority, the certificate service 102 may store the certificate authority in association with an account.

It should be noted that, in some examples, the example process 400 may not include one or more 402-412. For example, the example process 400 may not include determining the key type, determining the tag, and/or determining the policy. Additionally, in other examples, the example process 400 may include receiving one or more additional indications from the user device 110(1). For example, the example process 400 may include receiving an indication to create a certificate revocation list for the certificate authority.

Figure 6:
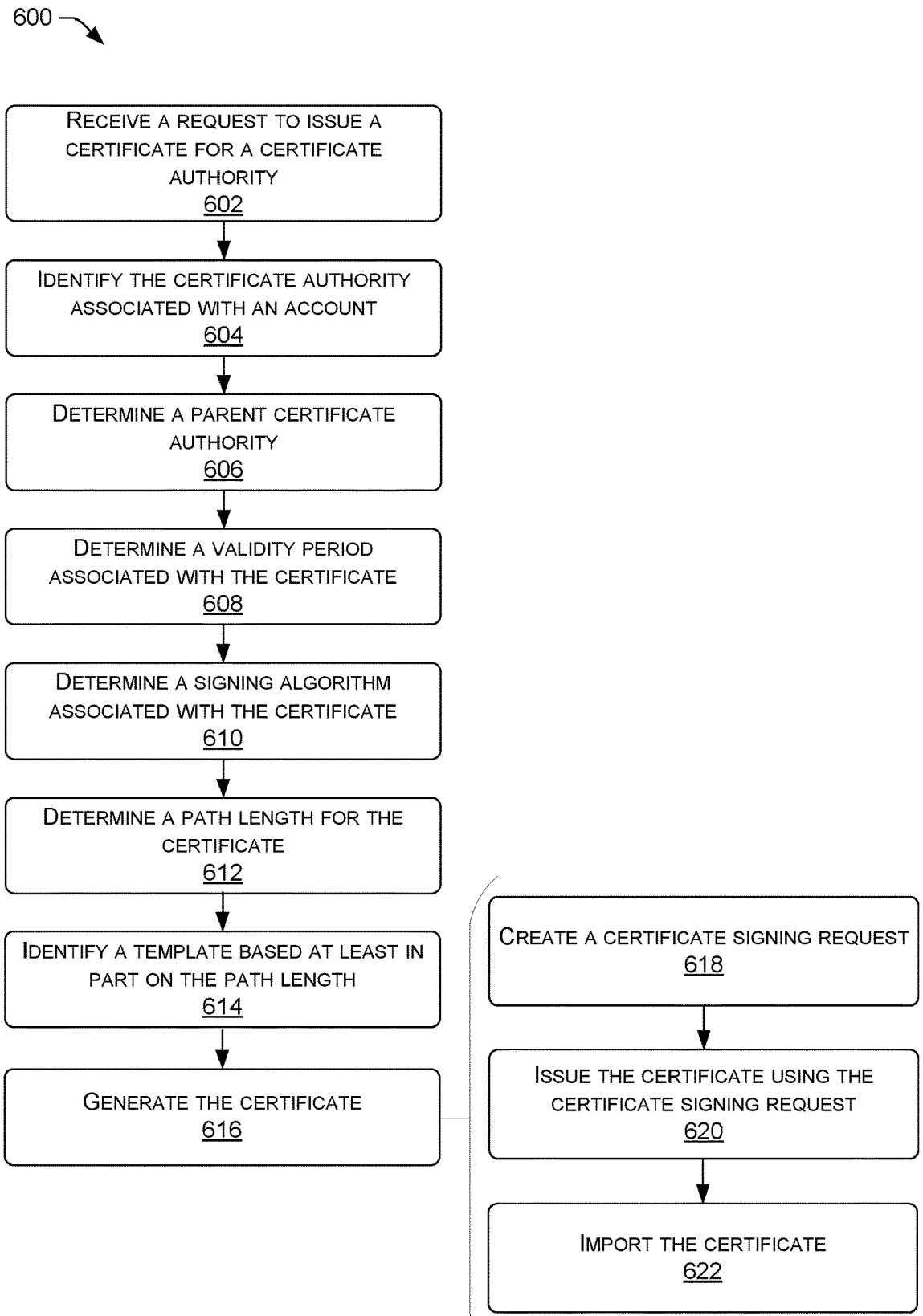
FIG. 6 illustrates an example process for issuing a subordinate certificate using an internal parent certificate authority, according to an embodiment of the present disclosure.
Figure 7:
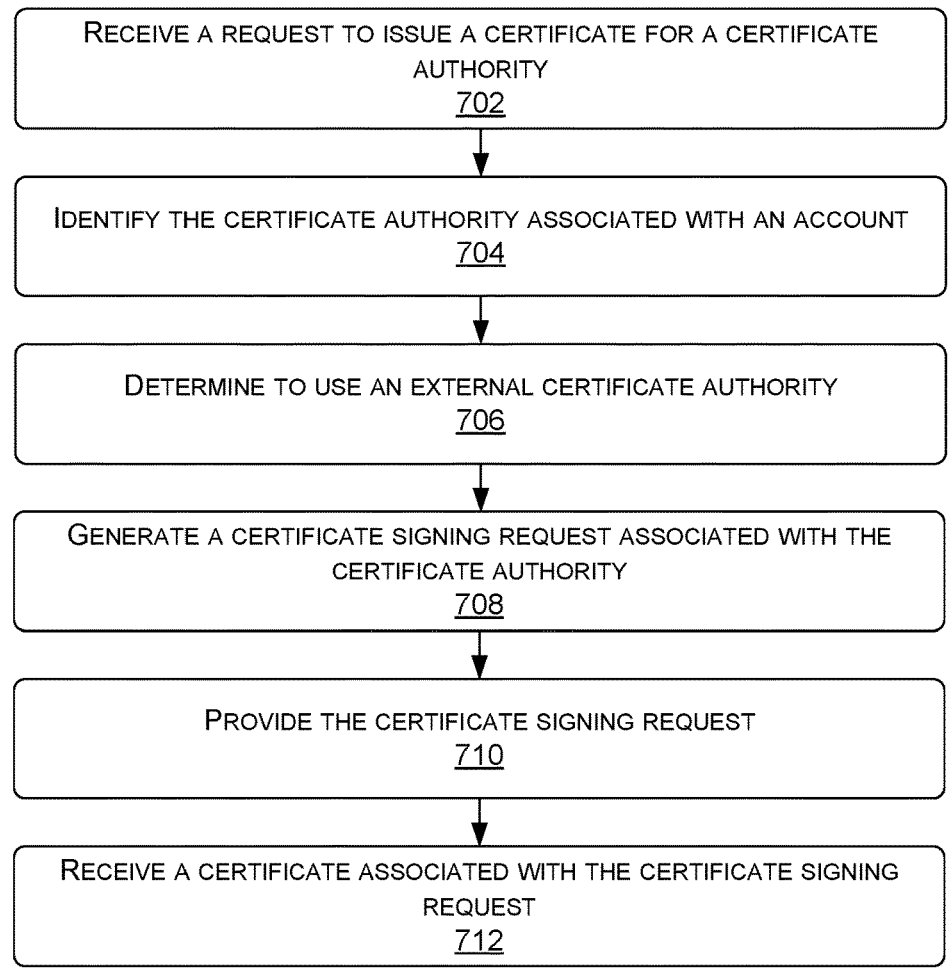
FIG. 7 illustrates an example process for issuing a subordinate certificate using an external parent certificate authority, according to an embodiment of the present disclosure.

Additionally, in some examples, after creating the certificate authority, the certificate service 102 may provide an option to issue a certificate for the certificate authority. If the certificate service 102 receives an input indicating a selection not to issue the certificate, then the certificate service 102 may wait to issue the certificate for the certificate authority. Additionally, in some instances, the certificate service 102 may set a state of the certificate authority to include "pending". However, if the certificate service 102 receives an input indicating a selection to issue the certificate, then the certificate service 102 may perform one or more processes for issuing the certificate, which are illustrated in FIGS. 5-7.

Figure 5:
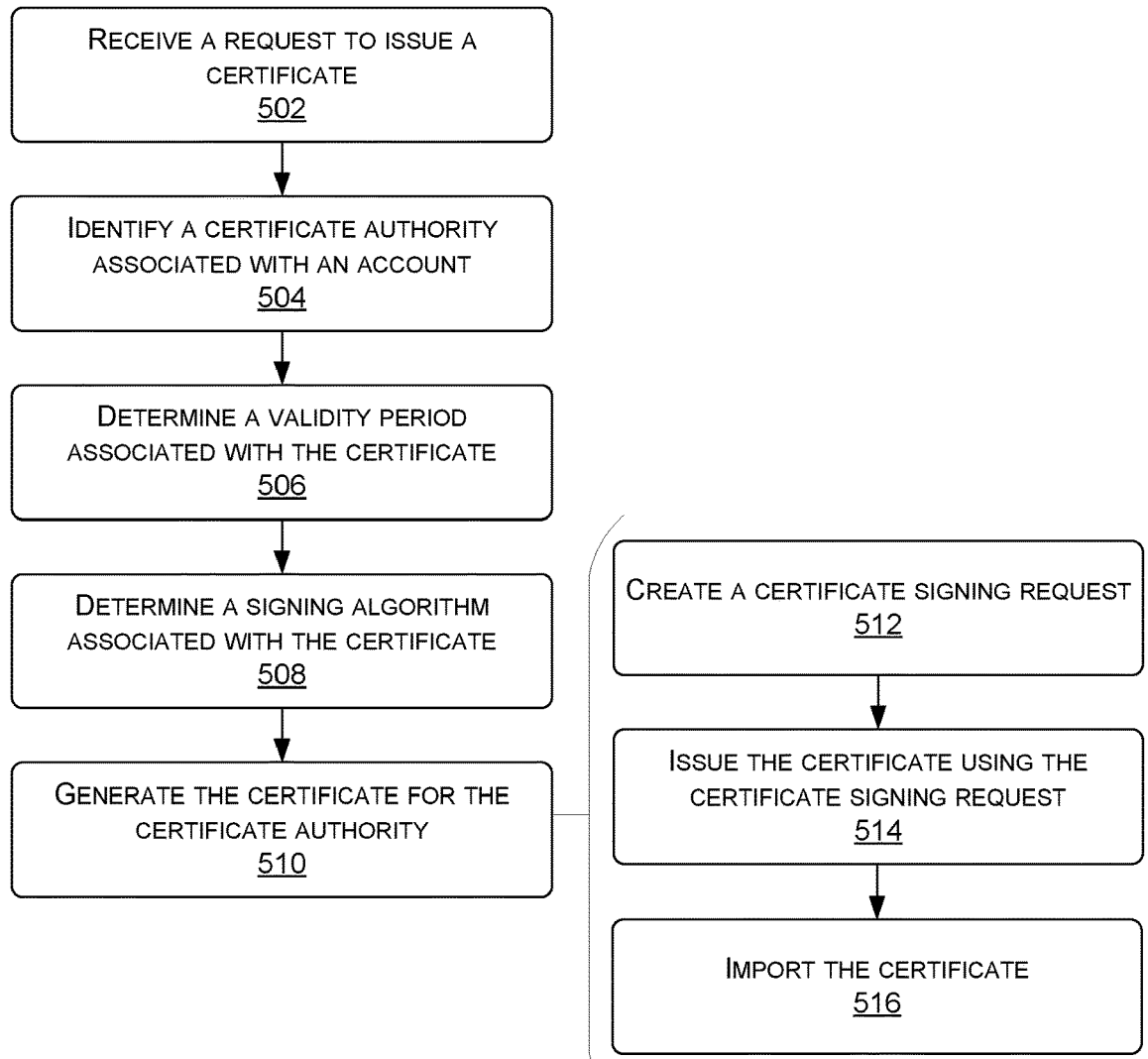
FIG. 5 illustrates an example process for issuing a root certificate, according to an embodiment of the present disclosure.

FIG. 5 illustrates an example process 500 for issuing a root certificate for a root certificate authority, according to an embodiment of the present disclosure. At 502, the process 500 may include receiving a request to issue a certificate and at 504, the process 500 may include identifying a certificate authority associated with an account. For instance, the certificate service 102 may provide one or more user interfaces for issuing the certificate. While providing the one or more user interfaces, the certificate service 102 may receive, from the user device 110(1), the request to generate the certificate. In some instances, the request may indicate the type of certificate and/or indicate the certificate authority for the certificate. As such, the certificate service 102 may use the request to identify the certificate authority. For a first example, if the request is to generate a root certificate, then the certificate service 102 may identify the root certificate authority. For a second example, the certificate service 102 may identify the root certificate authority when the request indicates a selection of the root certificate authority.

At 506, the process 500 may include determining a validity period associated with the certificate and at 508, the process 500 may include determining a signing algorithm associated with the certificate. For instance, the certificate service 102 may receive, from the user device 110(1), a first indication of the validity period and a second indication of the signing algorithm. As discussed above, the validity period may indicate the length of time that the certificate will be valid. Additionally, the signing algorithm may specify which algorithm the certificate authority will use when issuing new certificates.

At 510, the process 500 may include generating the certificate. For instance, the certificate service 102 may generate the certificate using the inputting information. In some instances, to generate the certificate, and at 512, the certificate service 102 creates a certificate signing request using the identified certificate authority. The certificate signing request may include at least the public key associated with the certificate authority. After getting the certificate signing request, and at 514, since the certificate may include a root certificate, the certificate service 102 may then issue the certificate using the certificate signing request, a template associated with root certificates, and the private key associated with the certificate authority. For example, the certificate service 102 may sign the certificate signing request using the private key associated with the certificate authority. Additionally, and at 516, the certificate service 102 may import the certificate for the certificate authority. In some instances, by importing the certificate, the certificate service 102 has then activated the certificate authority for the user. As such, the user may then use the certificate authority to issue new certificates.

FIG. 6 illustrates an example process 600 for issuing a subordinate certificate using an internal parent certificate authority, according to an embodiment of the present disclosure. At 602, the process 600 may include receiving a request to issue a certificate for a certificate authority and at 604, the process 600 may include identifying the certificate authority associated with an account. For instance, the certificate service 102 may provide one or more user interfaces for issuing the certificate. The one or more user interfaces may provide one or more certificate authorities that are associated with an account. While providing the one or more user interfaces, the certificate service 102 may receive, from the user device 110(1), a first indication selecting the certificate authority. In the example of FIG. 6, the certificate authority may include a subordinate certificate authority.

At 606, the process 600 may include determining a parent certificate authority. For instance, the one or more user interfaces may provide one or more certificate authorities that the user may select to be the parent certificate authority. The one or more certificate authorities may include at least a root certificate authority and/or one or more subordinate certificate authorities included in a certificate hierarchy. As such, the certificate service 102 may receive, from the user device 110(1), a second indication selecting one of the certificate authorities to act as the parent certificate authority for the certificate.

At 608, the process 600 may include determining a validity period associated with the certificate and at 610, the process 600 may include determining a signing algorithm associated with the certificate. For instance, the certificate service 102 may receive, from the user device 110(1), a third indication of the validity period and a fourth indication of the signing algorithm. As discussed above, the validity period may indicate the length of time that the certificate will be valid. Additionally, the signing algorithm may specify which algorithm the certificate authority will use when issuing new certificates.

At 612, the process 600 may include determining a path length for the certificate and at 614, the process 600 may include identifying a template based at least in part on the path length. For instance, the certificate service 102 may receive, from the user device 110(1), a fifth indication of the path length. As described above, the path length may specify the number of trust layers that the certificate authority may add when signing new certificates. In some instances, the path length is between zero and three. The certificate authority 102 may then use the path length to identify the template for issuing the certificate. For instance, the certificate authority 102 may identify a first template for a path length of zero, a second template for a path length of one, a third template for a path length of two, a fourth template for a path length of three, and/or so forth.

At 616, the process 600 may include generating the certificate. For instance, the certificate service 102 may generate the certificate using the inputted information. In some instances, and at 618, the certificate service 102 may create a certificate signing request using the information, such as the subject name, associated with the certificate authority. The certificate signing request may include the public key of the certificate authority. Next, and at 620, the certificate service 102 may then issue the certificate using the certificate signing request, the identified template, and a certificate associated with the selected parent certificate authority. For instance, the certificate service 102 may sign the certificate signing request using the private key from the selected parent certificate. Additionally, and at 622, the certificate service 102 may import the certificate for the certificate authority. In some instances, by importing the certificate, the certificate service 102 has then activated the certificate authority for the user. As such, the user may then use the certificate authority to issue new certificates.

FIG. 7 illustrates an example process 700 for issuing a subordinate certificate using an external parent certificate authority, according to an embodiment of the present disclosure. At 702, the process 700 may include receiving a request to issue a certificate for a certificate authority and at 704, the process 700 may include identifying the certificate authority associated with an account. For instance, the certificate service 102 may provide one or more user interfaces for issuing the certificate. The one or more user interfaces may provide one or more certificate authorities that are associated with an account. While providing the one or more user interfaces, the certificate service 102 may receive, from the user device 110(1), a first indication selecting the certificate authority. In the example of FIG. 7, the certificate authority may include a subordinate certificate authority.

At 706, the process 700 may include determining to use an external certificate authority. For instance, the certificate service 102 may receive, from the user device 110(1), a second indication to use the external certificate authority. This may allow the user to issue the certificate using the certificate authority that is external to the certificate service 102.

At 708, the process 700 may include generating a certificate signing request associated with the certificate authority and at 710, the process 700 may include providing the certificate signing request. For instance, the certificate service 102 may generate the certificate signing request using the information, such as the subject name, associated with the certificate authority. The certificate signing request may also include the public key of the certificate authority. After generating the certificate signing request, the certificate service 102 may send the certificate signing request to the user device 110(1). This way, the user is able to use the user device 110(1) to get the certificate signing request signed using the external certificate authority.

At 712, the process 700 may include receiving the certificate associated with the certificate signing request. For instance, the certificate service 102 may receive the certificate from the user device 110(1), where the certificate is signed using the external certificate authority. The certificate service 102 may then store the certificate in association with the certificate authority of the account of the user.

Figure 8:
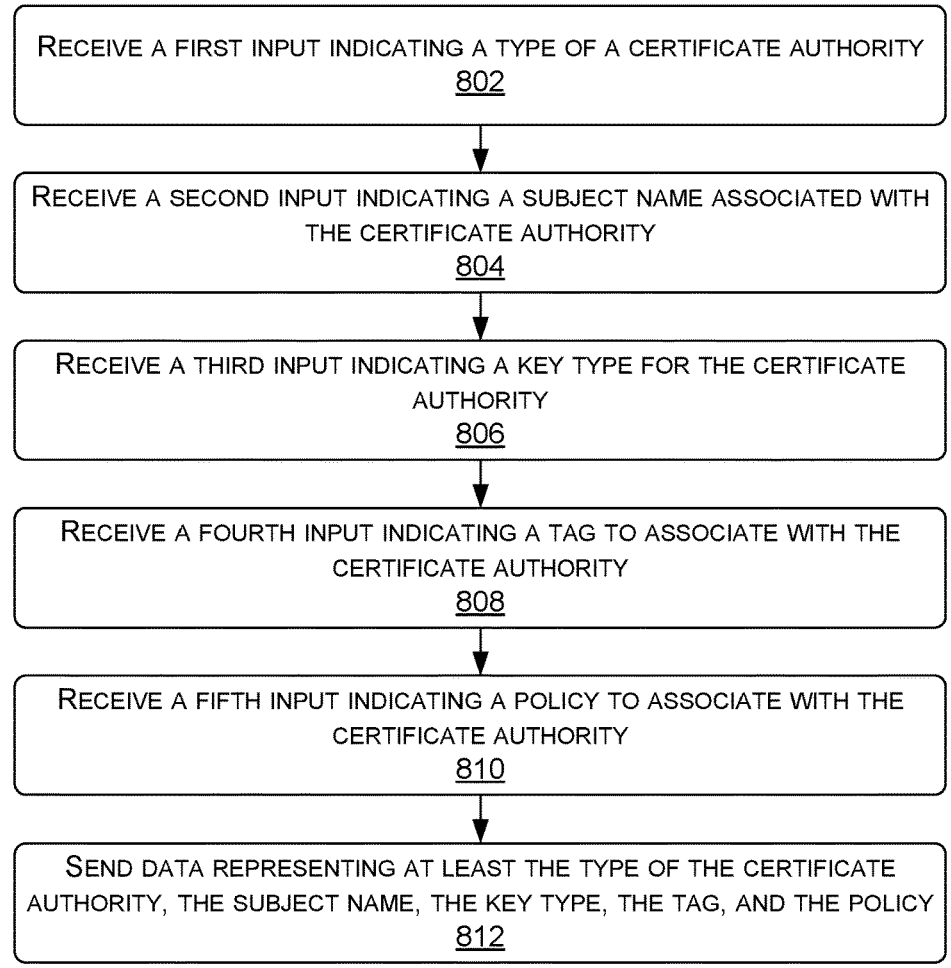
FIG. 8 illustrates an example process for inputting information to create a certificate authority, according to an embodiment of the present disclosure.

FIG. 8 illustrates an example process 800 for inputting information to issue a certificate authority, according to an embodiment of the present disclosure. At 802, the process 800 may include receiving a first input indicating a type of certificate authority. For instance, the user device 110(1) may display one or more user interfaces for creating certificate authorities. While displaying a user interface, the user device 110(1) may receive the first input indicating the type of certificate authority. As described herein, the type of certificate authority may include, but is not limited to, a root certificate authority, a subordinate certificate authority (which may also include an intermediate certificate authority and an issuing certificate authority), and/or any other type of certificate authority.

At 804, the process 800 may include receiving a second input indicating a subject name to associate with the certificate authority and at 806, the process 800 may include receiving a third input indicating of a key type for the certificate authority. For instance, the user device 110(1) may receive the second input indicating the subject name and the third input indicating the key type. As discussed above, the subject name to associate with the certificate authority may include, but is not limited to, an organization name, an organization unit name, a country name, a state or province name, a locality name, a common name, and/or any other type of identifier associated with the entity. Additionally, the key type may be associated with the type of algorithm used to generate the private key and/or the public key that will be associated with the certificate authority.

At 808, the process 800 may include receiving a fourth input indicating a tag to associate with the certificate authority and at 810, the process 800 may include receiving a fifth input indicating a policy to associate with the certificate authority. For instance, the user device 110(1) may receive the fourth input indicating the tag and the fifth input indicating of the policy. As discussed above, the tag may include key and/or value pairs that serve as metadata for identifying and organizing the certificate authority. Additionally, the policy may be associated with renewing certificates generated using the certificate authority at a time of expiration.

For example, the user may set a policy that automatically renews end-entity certificates generated using the certificate authority.

Figure 10:
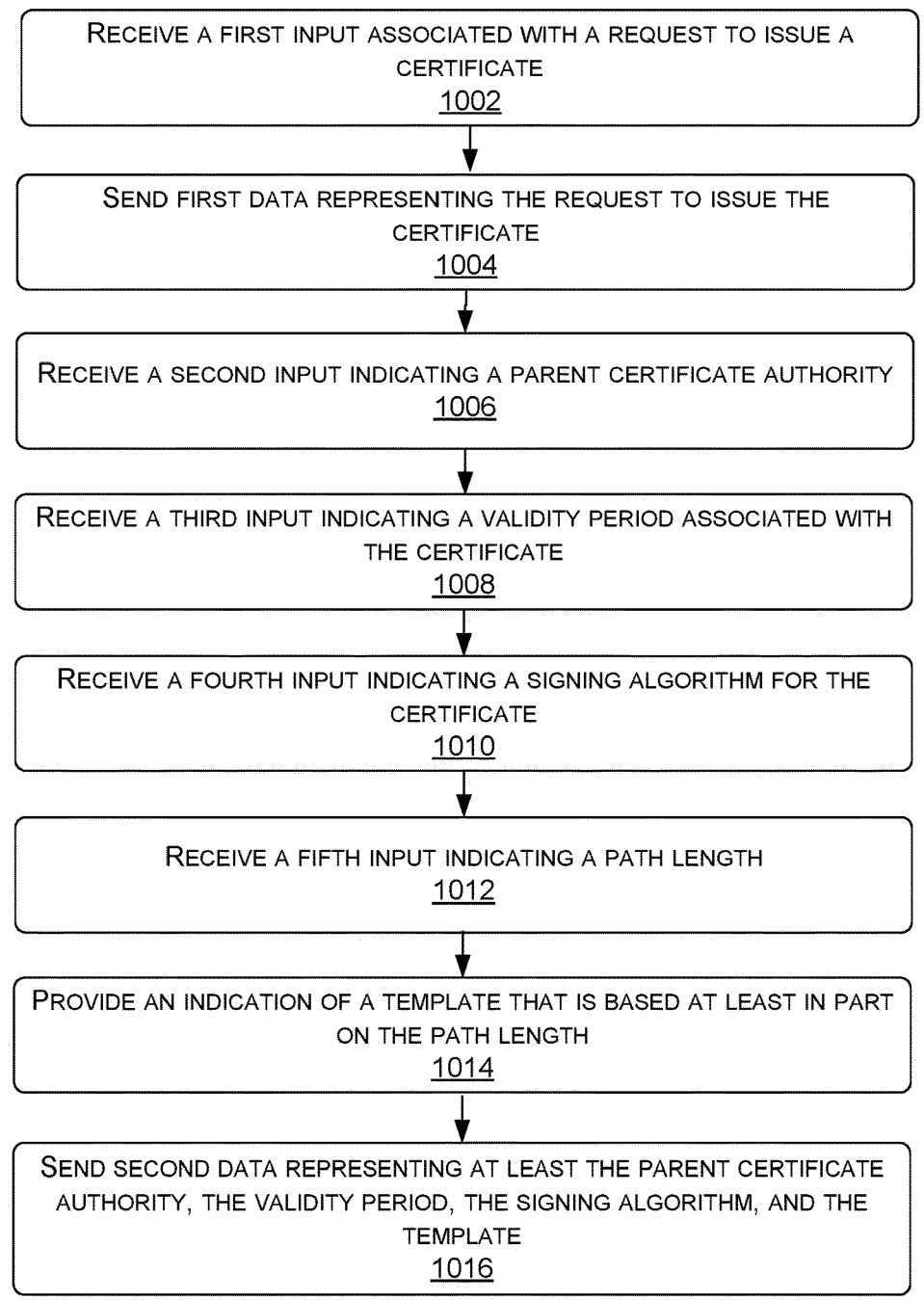
FIG. 10 illustrates an example process for inputting information to issue a subordinate certificate using an internal parent certificate authority, according to an embodiment of the present disclosure.
Figure 11:
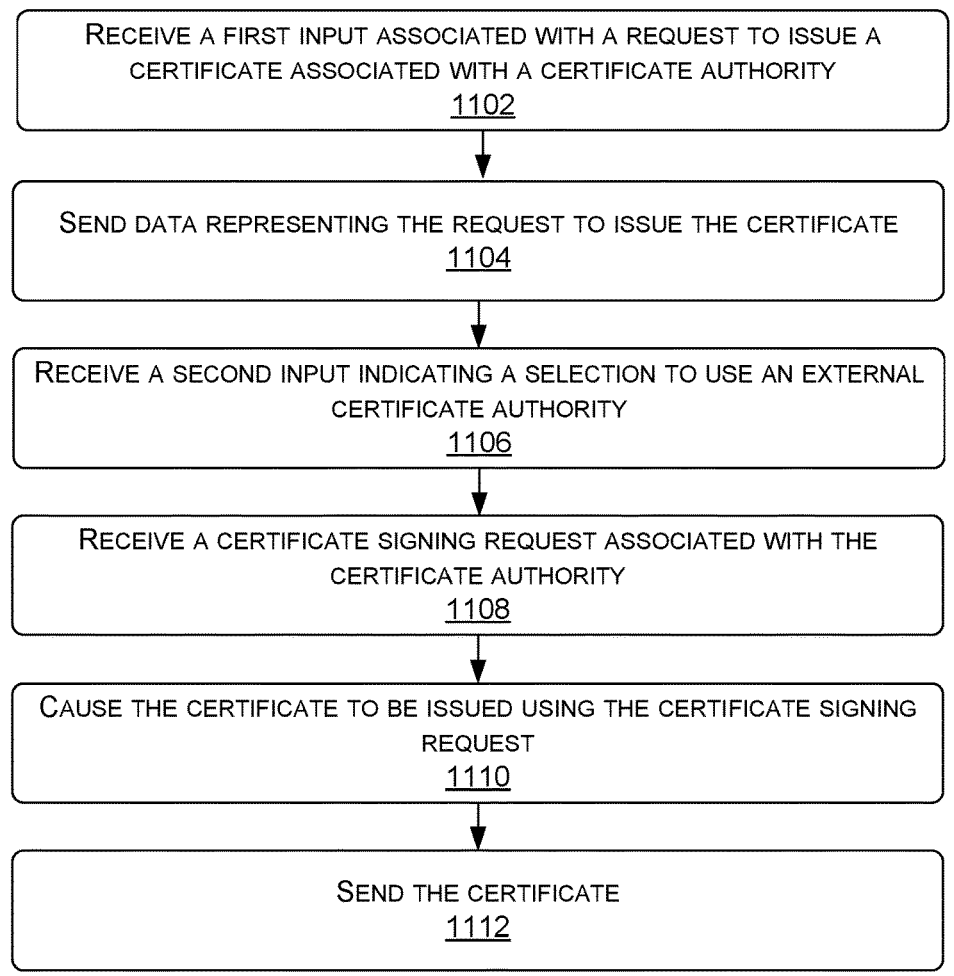
FIG. 11 illustrates an example process for inputting information to issue a subordinate certificate using an external parent certificate authority, according to an embodiment of the present disclosure.

At 812, the process 800 may include sending data representing at least the type of the certificate authority, the subject name, the key type, the tag, and the policy. For instance, the user device 110(1) may send, to the certificate service 102, the data representing the type of the certificate authority, the subject name, the key type, the tag, and the policy. The certificate service 102 may then use the data to generate the certificate authority for the account of the user. Additionally, the user device 110(1) may then provide the user with an option to issue a certificate for the certificate authority. If the user device 110(1) receives an input indicating a selection not to issue the certificate, then the certificate service 102 may wait to issue the certificate for the certificate authority. However, if the user device 110(1) receives an input indicating a selection to issue the certificate, then the user device 110(1) may perform one or more processes for issuing the certificate, which are illustrated in FIGS. 9-11.

It should be noted that, in some examples, the example process 800 may not include one or more 802-810. For example, the example process 800 may not include receiving the second input indicating the key type, receiving the fourth input indicating the tag, and/or receiving the fifth input indicating the policy. Rather, in such examples, the certificate service 102 may automatically make one or more of these selections when creating the certificate authority. Additionally, in other examples, the example process 800 may include receiving one or more additional inputs from the user. For example, the example process 800 may include receiving an input associated with creating a certificate revocation list for the certificate authority.

Figure 9:
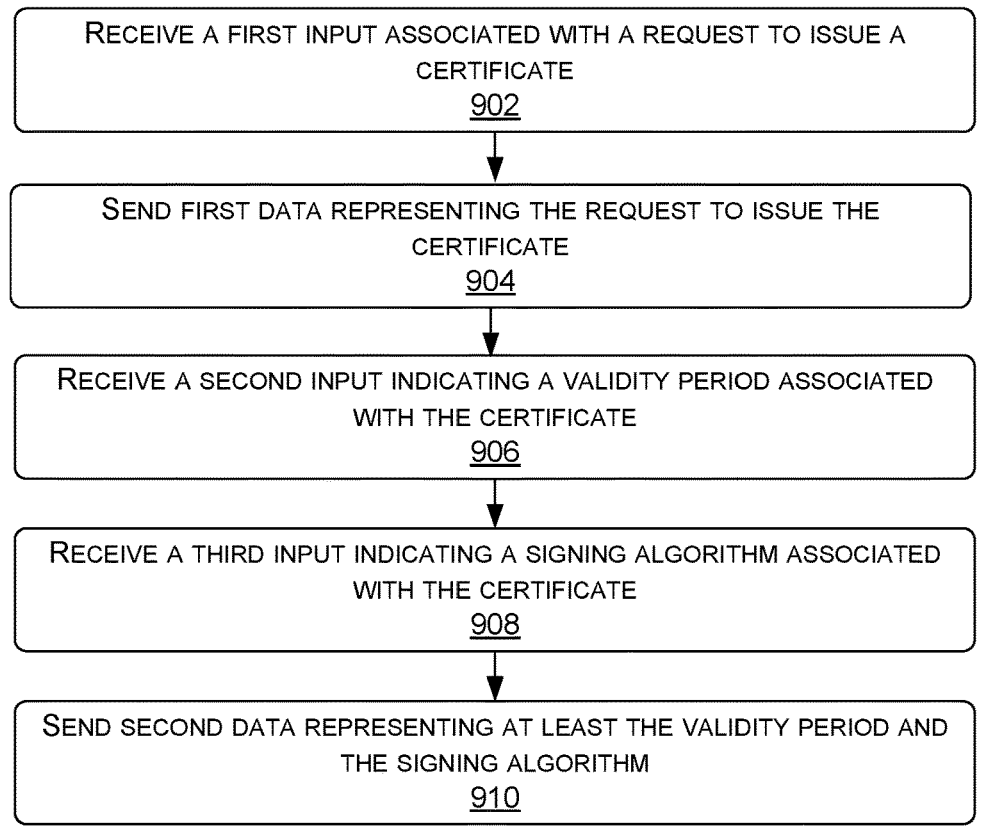
FIG. 9 illustrates an example process for inputting information to issue a root certificate, according to an embodiment of the present disclosure.

FIG. 9 illustrates an example process 900 for inputting information to issue a root certificate for a root certificate authority, according to an embodiment of the present disclosure. At 902, the process 900 may include receiving a first input associated with a request to issue a certificate and at 904, the process 900 may include sending first data representing the request to issue the certificate. For instance, the user device 110(1) may provide one or more user interfaces for issuing the certificate. While providing the one or more user interfaces, the user device 110(1) may receive the first input representing the request to issue the certificate. In some instances, the request may indicate the type of certificate and/or indicate the certificate authority for the certificate. The user device 110(1) may then send, to the certificate service 102, the first data representing the request.

At 906, the process 900 may include receiving a second input indicating a validity period associated with the certificate and at 908, the process 900 may include receiving a third input indicating a signing algorithm associated with the certificate. For instance, the user device 110(1) may receive the second input indicating the validity period and the third input indicating the signing algorithm. As discussed above, the validity period may indicate the length of time that the certificate will be valid. Additionally, the signing algorithm may specify which algorithm the certificate authority will use when issuing new certificates.

At 910, the process 900 may include sending second data representing at least the validity period and the signing algorithm. For instance, the user device 110(1) may provide a user interface that includes a configuration associated with the certificate. The configuration may indicate at least the validity period and the signing algorithm. The user device 110(1) may then receive an input confirming the configuration of the certificate. In response, the user device 110(1) may send, to the certificate service 102, the second data representing at least the validity period and the signing algorithm. In some instances, after the certificate service 102 generates the certificate, the user device 110(1) may receive the certificate from the certificate service 102.

FIG. 10 illustrates an example process 1000 for inputting information to issue a subordinate certificate using an internal parent certificate authority, according to an embodiment of the present disclosure. At 1002, the process 1000 may include receiving a first input associated with a request to issue a certificate and at 1004, the process 1000 may include sending first data representing the request to issue the certificate. For instance, the user device 110(1) may provide one or more user interfaces for issuing the certificate. While providing the one or more user interfaces, the user device 110(1) may receive the first input representing the request to issue the certificate. In some instances, the request may indicate the type of certificate (e.g., subordinate certificate) and/or indicate the certificate authority (e.g., subordinate certificate authority) for the certificate. The user device 110(1) may then send, to the certificate service 102, the first data representing the request.

At 1006, the process 1000 may include receiving a second input indicating a parent certificate authority. For instance, the one or more user interfaces may provide one or more certificate authorities that the user may select to be the parent certificate authority. The one or more certificate authorities may include at least a root certificate authority and/or one or more subordinate certificate authorities included in a certificate hierarchy. As such, the user device 110(1) may receive the second input indicating a selection of one of the certificate authorities to act as the parent certificate authority for the certificate.

At 1008, the process 1000 may include receiving a third input indicating a validity period associated with the certificate and at 1010, the process 1000 may include receiving a fourth input indicating a signing algorithm for the certificate. For instance, the user device 110(1) may receive the third input indicating the validity period and the fourth input indicating the signing algorithm. As discussed above, the validity period may indicate the length of time that the certificate will be valid. Additionally, the signing algorithm may specify which algorithm the certificate authority will use when issuing new certificates.

At 1012, the process 1000 may include receiving a fifth input indicating a path length and at 1014, the process 1000 may include providing an indication of a template that is based at least in part on the path length. For instance, the user device 110(1) may receive the fifth input indicating the path length. As described above, the path length may specify the number of trust layers that the certificate authority may add when signing new certificates. In some instances, the path length is between zero and three. The user device 110(1) may then display the template that is associated with the selected path length. For instance, the user device 110(1) may display a first template for a path length of zero, a second template for a path length of one, a third template for a path length of two, a fourth template for a path length of three, and/or so forth.

At 1016, the process 1000 may include sending second data representing at least the parent certificate authority, the validity period, the signing algorithm, and the template. For instance, the user device 110(1) may provide a user interface that includes a configuration associated with the certificate. The configuration may indicate at least the parent certificate authority, the validity period, the signing algorithm, and the template. The user device 110(1) may then receive an input confirming the configuration of the certificate. In response, the user device 110(1) may send, to the certificate service 102, the second data representing at least the parent certificate authority, the validity period, the signing algorithm, and the template. In some instances, after the certificate service 102 generates the certificate, the user device 110(1) may receive the certificate from the certificate service 102.

FIG. 11 illustrates an example process 1100 for inputting information for issuing a subordinate certificate using an external parent certificate authority, according to an embodiment of the present disclosure. At 1102, the process 1100 may include receiving a first input associated with a request to issue a certificate associated with a certificate authority and at 1104, the process 1100 may include sending data representing the request to issue the certificate. For instance, the user device 110(1) may provide one or more user interfaces for issuing the certificate. While providing the one or more user interfaces, the user device 110(1) may receive the first input representing the request to issue the certificate. In some instances, the request may indicate the type of certificate (e.g., subordinate certificate) and/or indicate the certificate authority (e.g., subordinate certificate authority) for the certificate. The user device 110(1) may then send, to the certificate service 102, the first data representing the request.

At 1106, the process 1100 may include receiving a second input indicating a selection to use an external certificate authority and at 1108, the process 1100 may include receiving a certificate signing request associated with the certificate authority. For instance, the user device 110(1) may receive the second input indicating the selection to use the external certificate authority. As such, the certificate service 102 may generate the certificate signing request associated with the certificate authority and provide the user device 110(1) with the certificate signing request and/or information associated with certificate information. The user device 110(1) may then export the certificate signing request to a file.

At 1110, the process 1100 may include causing the certificate to be issued using the certificate signing request and at 1112, the process 1100 may include sending the certificate. For instance, the user device 110(1) may send at least the certificate signing request (e.g., the file) to an external certificate authority. The external certificate authority may then issue the certificate by at least signing the certificate signing request. After the external certificate authority issues the certificate, the user device 110(1) may receive the certificate from the external certificate authority. Additionally, the user device 110(1) may send the certificate to the certificate service 102. This way, the certificate service 102 may store the certificate in association with the certificate authority and/or the account.

Figure 12:
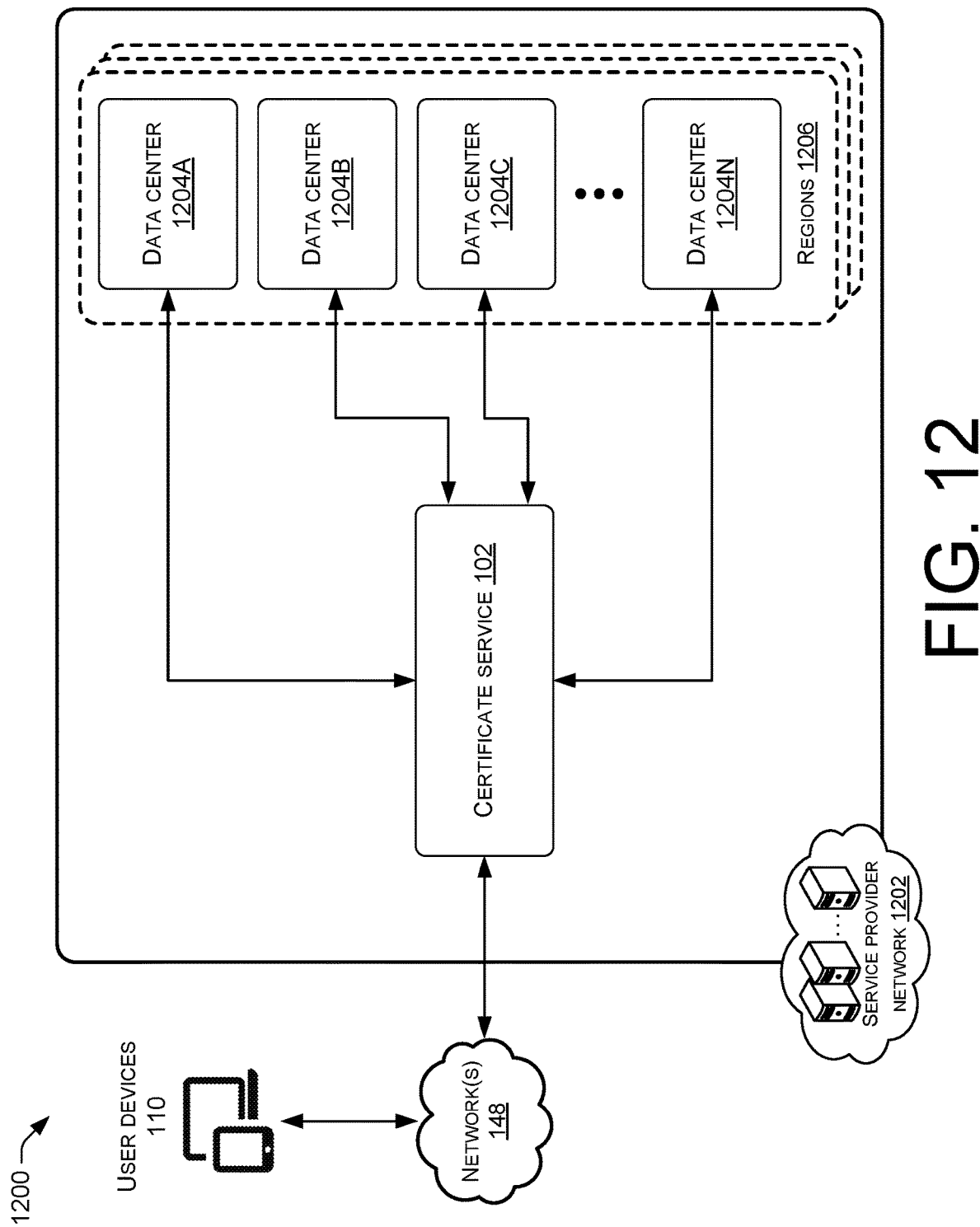
FIG. 12 illustrates an example system and network diagram that shows an operating environment including a service provider network that may be configured to implement aspects of the functionality described herein, according to an embodiment of the present disclosure.

FIG. 12 is a system and network diagram that shows an illustrative operating environment 1200 that includes a service provider network 1202. The service provider network 1202 may be configured to implement aspects of the functionality described herein, such as the functions of the certificate service 102 that allows users to generate and manage both certificate authorities and certificates. The service provider network 1202 may provide computing resources, like virtual machine (VM) instances and storage, on a permanent or an as-needed basis. The computing resources provided by the network service provider 1202 may include data processing resources, data storage resources, networking resources, data communication resources, network services, and the like. Among other types of functionality, the computing resources provided by the service provider network 1202 may be utilized to implement the various services and components described above.

Each type of computing resource provided by the service provider network 1202 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 1202 may also be configured to provide other types of computing resources not mentioned specifically herein.

The computing resources provided by the service provider network 1202 may be enabled in one embodiment by one or more data centers 1204A-1204N (which might be referred to herein singularly as "a data center 804" or in the plural as "the data centers 1204"). The data centers 1204 are facilities utilized to house and operate computer systems and associated components. The data centers 1204 typically include redundant and backup power, communications, cooling, and security systems. The data centers 1204 may also be located in geographically disparate locations, or regions 1206. One illustrative embodiment for a data center 1204 that may be utilized to implement the technologies disclosed herein will be described below with regard to FIG. 13.

The users 108 that utilize the service provider network 1202 for the certificate service 102, may access the computing resources provided by the service provider network 1202 over any wired and/or wireless network(s) 148, which may be a wide area communication network ("WAN"), such as the Internet, an intranet or an Internet service provider ("ISP") network or a combination of such networks. For example, and without limitation, the user devices 110 operated by the users 108 may be utilized to access the service provider network 1202, or computing resources thereof, by way of the network(s) 148. It should be appreciated that a local-area network ("LAN"), the Internet, or any other networking topology known in the art that connects the data centers 1204 to remote clients and other users may be utilized. It should also be appreciated that combinations of such networks may also be utilized. The certificate service 102 offered as a service by the service provider network 1202 may manage the deployment of computing resources of the service provider network 1202 when generating and managing certificate authorities.

Figure 13:
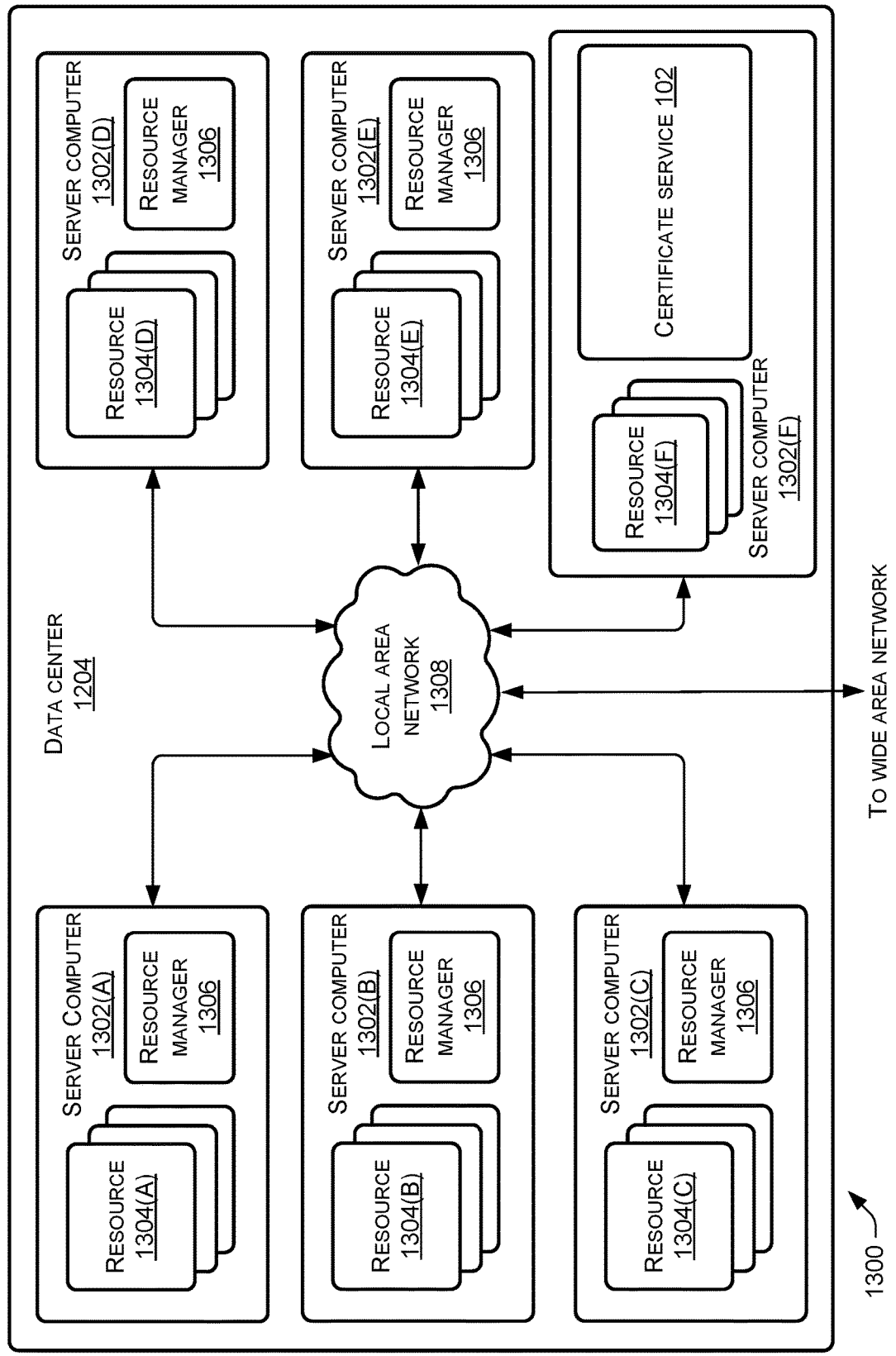
FIG. 13 illustrates an example computing system diagram showing a configuration for a data center that may be utilized to implement aspects of the technologies disclosed herein, according to an embodiment of the present disclosure.

FIG. 13 is a computing system diagram 1300 that illustrates one configuration for the data center 1204 that implements aspects of the technologies disclosed herein. The example data center 1204 shown in FIG. 13 includes several server computers 1302A-1302F (which might be referred to herein singularly as "a server computer 1302" or in the plural as "the server computers 1302") for providing computing resources 1304A-1304E.

The server computers 1302 may be standard tower, rackmount, or blade server computers configured appropriately for providing the computing resources described herein (illustrated in FIG. 13 as the computing resources 1304A-1304E). The computing resources provided by the service provider network 1302 may be data processing resources such as VM instances or hardware computing systems, database clusters, computing clusters, storage clusters, data storage resources, database resources, networking resources, and others. Some of the server computers 1302 may also be configured to execute a resource manager 1306 capable of instantiating and/or managing the computing resources. In the case of VM instances, for example, the resource manager 1306 may be a hypervisor or another type of program configured to enable the execution of multiple VM instances on a single server computer 1302. Server computers 1302 in the data center 1204 may also be configured to provide network services and other types of services.

In the example data center 1204 shown in FIG. 13, an appropriate LAN 1308 is also utilized to interconnect the server computers 1302A-1302F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of the data centers 1204A-1204N, between each of the server computers 1302A-1302F in each data center 1204, and, potentially, between computing resources in each of the server computers 1302. It should be appreciated that the configuration of the data center 1204 described with reference to FIG. 13 is merely illustrative and that other implementations may be utilized.

The data center 1204 shown in FIG. 13 also includes a server computer 1302F that may execute some or all of the software components described above. For example, and without limitation, the server computer 1302F (and the other server computers 1302) may generally correspond to a server/computing device configured to execute components including, without limitation, the certificate service 102 that generates and manages certificate authorities, as described herein, and/or the other software components described above. The server computer 1302F may also be configured to execute other components and/or to store data for providing some or all of the functionality described herein. In this regard, it should be appreciated that the components illustrated in FIG. 13 as executing on the server computer 1302F may execute on many other physical or virtual servers in the data centers 1204 in various embodiments. Thus, the data center 1204 in FIG. 13 may also include a plurality of server computers 1302 that execute a fleet of VM instances.

Figure 14:
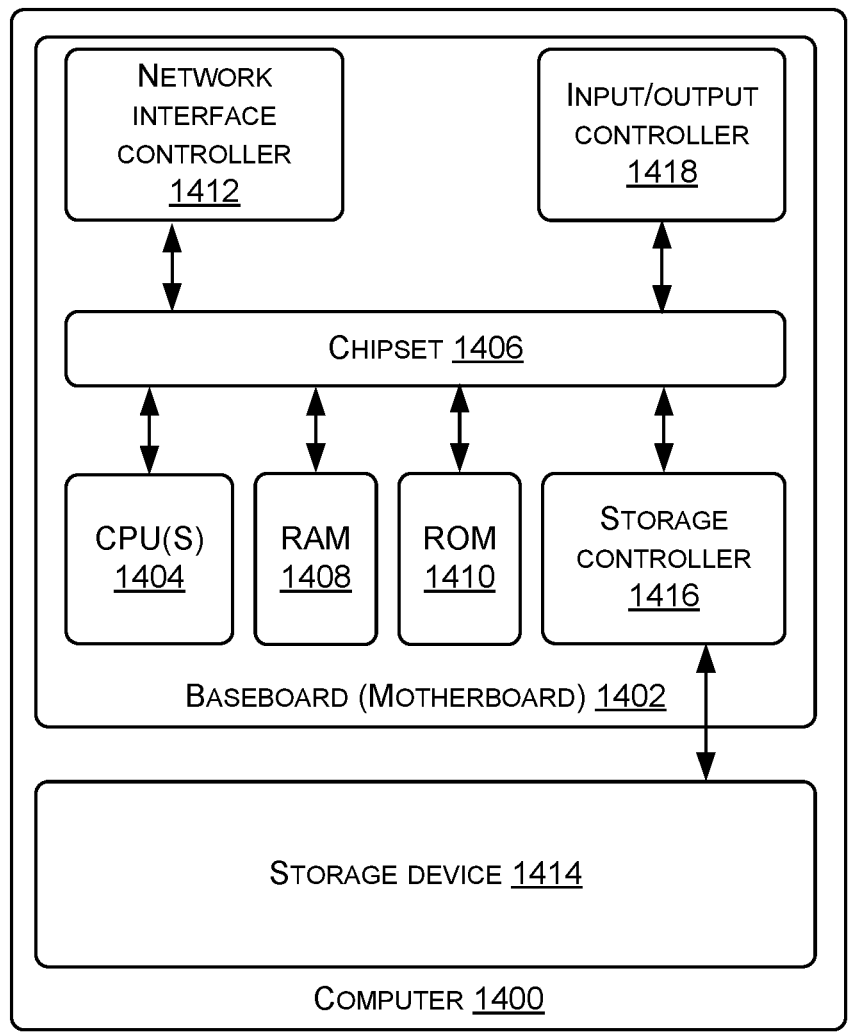
FIG. 14 illustrates an example computer architecture diagram showing an exemplary computer hardware architecture for implementing a computing device that may be utilized to implement aspects of the various technologies presented herein, according to an embodiment of the present disclosure.

FIG. 14 shows an example computer architecture for a computer 1400 capable of executing program components for implementing the functionality described above. The computer architecture shown in FIG. 14 illustrates a server computer, workstation, desktop computer, laptop, tablet, network appliance, e-reader, smartphone, or other computing device, and may be utilized to execute any of the software components presented herein. In some examples, the computer 1400 may correspond to one or more computing devices that implements the components and/or services described herein (e.g., the user devices 110, the certificate service 102, etc.).

The computer 1400 includes a baseboard 1402, or "motherboard," which is a printed circuit board to which a multitude of components or devices may be connected by way of a system bus or other electrical communication paths. In one illustrative configuration, one or more central processing units ("CPUs") 1404 operate in conjunction with a chipset 1406. The CPUs 1404 may be standard programmable processors that perform arithmetic and logical operations necessary for the operation of the computer 1400.

The CPUs 1404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1406 provides an interface between the CPUs 1404 and the remainder of the components and devices on the baseboard 1402. The chipset 1406 may provide an interface to a random-access memory (RAM) 1408, used as the main memory in the computer 1400. The chipset 1406 may further provide an interface to a computer-readable storage medium such as a read-only memory ("ROM") 1410 or non-volatile RAM ("NVRAM") for storing basic routines that help to startup the computer 1400 and to transfer information between the various components and devices. The ROM 1410 or NVRAM may also store other software components necessary for the operation of the computer 1400 in accordance with the configurations described herein.

The computer 1400 may operate in a networked environment using logical connections to remote computing devices and computer systems through a network, such as the LAN 1308. The chipset 1406 may include functionality for providing network connectivity through a network interface controller (NIC) 1412, such as a gigabit Ethernet adapter. The NIC 1412 is capable of connecting the computer 1400 to other computing devices over the LAN 908 (or the network 148). It should be appreciated that multiple NICs 1412 may be present in the computer 1400, connecting the computer to other types of networks and remote computer systems.

The computer 1400 may be connected to a mass storage device 1414 that provides non-volatile storage for the computer 1400. The mass storage device 1414 may store an operating system, programs, and/or components including, without limitation, the certificate service 102 that manages the generating and managing of certificate authorities and/or certificates, as described herein, and data, which have been described in greater detail herein. The mass storage device 1414 may be connected to the computer 1400 through a storage controller 1416 connected to the chipset 1406. The mass storage device 1414 may consist of one or more physical storage units. The storage controller 1416 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1400 may store data on the mass storage device 1414 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 1414 is characterized as primary or secondary storage, and the like.

For example, the computer 1400 may store information to the mass storage device 1414 by issuing instructions through the storage controller 1416 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1400 may further read information from the mass storage device 1414 by detecting the physical states or characteristics of one or more particular locations within the physical storage units.

In addition to the mass storage device 1414 described above, the computer 1400 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1400. In some examples, the operations performed by the service provider network 1202, and or any components and/or services included therein, may be carried out by the processor(s) 142.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 1414 may store an operating system utilized to control the operation of the computer 1400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX operating system or one of its variants. It should be appreciated that other operating systems may also be utilized. The mass storage device 1414 may store other system or application programs and data utilized by the computer 1400.

In one embodiment, the mass storage device 1414 or other computer-readable storage media is encoded with computer-executable instructions which, when loaded into the computer 1400, transform the computer from a general-purpose computing system into a special-purpose computer capable of implementing the embodiments described herein. These computer-executable instructions transform the computer 1400 by specifying how the CPUs 1404 transition between states, as described above. According to one embodiment, the computer 1400 has access to computer-readable storage media storing computer-executable instructions which, when executed by the computer 1400, perform the various processes described above with regard to FIGS. 4-10. The computer 1400 may also include computer-readable storage media having instructions stored thereupon for performing any of the other computer-implemented operations described herein.

The computer 1400 may also include one or more input/output controllers 1418 for receiving and processing input from a number of input devices, such as a keyboard, a mouse, a touchpad, a touch screen, an electronic stylus, or other type of input device. Similarly, an input/output controller 1418 may provide output to a display, such as a computer monitor, a flat-panel display, a digital projector, a printer, or other type of output device. It will be appreciated that the computer 1400 might not include all of the components shown in FIG. 14, may include other components that are not explicitly shown in FIG. 14, or might utilize an architecture completely different than that shown in FIG. 14.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    one or more processors; and
    one or more non-transitory computer-readable media storing instructions that, when executed by the one or more processors, cause the one or more processors to perform operations comprising:
        receiving, from a user device, a first request to create a root certificate authority;
        receiving, from the user device, a first indication of a first key type for the root certificate authority;
        generating, based on the first request and the first indication, the root certificate authority;
        generating, based on the first key type, a root private key and a root public key for the root certificate authority;
        receiving, from the user device, a second request to issue a root certificate for the root certificate authority;
        generating, based on the second request, a first certificate signing request associated with the root certificate authority, the first certificate signing request including at least the root public key;
        issuing the root certificate using at least the first certificate signing request and a first signature generated using the root private key;
        sending the root certificate to the user device;
        receiving, from the user device, a third request to create a subordinate certificate authority;
        receiving, from the user device, a second indication of a second key type for the subordinate certificate authority;
        generating, based on the third request and the second indication, the subordinate certificate authority;

generating, based on the second key type, a subordinate private key and a subordinate public key for the subordinate certificate authority;

receiving, from the user device, a fourth request to issue a subordinate certificate for the subordinate certificate authority;

receiving, from the user device, a third indication to use the root certificate authority to sign the subordinate certificate;

generating, based on the fourth request and the third indication, a second certificate signing request associated with the subordinate certificate authority, the second certificate signing request including at least the subordinate public key;

issuing the subordinate certificate using at least the second certificate signing request and a second signature generated using the root private key; and sending the subordinate certificate to the user device.

2. The system as recited in claim 1, the operations further comprising:

after issuing the subordinate certificate, receiving, from the user device, a fifth request to disable the subordinate certificate authority; and causing, based on the fifth request, the subordinate certificate authority to be disabled, wherein the subordinate certificate authority is prevented from issuing a new certificate based at least in part on the subordinate certificate authority being disabled.

3. The system as recited in claim 1, the operations further comprising:

receiving, from the user device, a first policy for at least a first user, the first policy providing permission to enable and disable at least one of the root certificate authority or the subordinate certificate authority;

storing the first policy; and receiving, from the user device, a second policy for at least a second user, the second policy providing permission to generate a new certificate using at least one of the root certificate authority or the subordinate certificate authority.

4. A method comprising:

generating, by a system, a first certificate authority, the first certificate authority being associated with a first private key;

receiving, by the system and from a user device, a first request to create a second certificate authority;

determining a type of authority associated with the second certificate authority;

determining of an identifier associated with the second certificate authority;

generating, by the system, the second certificate authority, the second certificate authority including the type of authority and being associated with the identifier;

generating a second private key and a public key associated with the second certificate authority;

receiving, by the system and from the user device, a second request to issue a certificate using the second certificate authority;

receiving, by the system and from the user device, a third indication to use the first certificate authority to sign the certificate;

generating, by the system, a certificate signing request associated with the second certificate authority, the certificate signing request including at least the public key;

issuing, by the system, the certificate associated with the second certificate authority based at least in part on the certificate signing request and a signature generated using the first private key; and sending the certificate.

5. The method as recited in claim 4, wherein:

the first certificate authority is a root certificate authority; and the second certificate authority is a subordinate certificate authority.

6. The method as recited in claim 4, wherein the type of authority is a first type of authority, the identifier is a first identifier, and the public key is a first public key, and wherein the method further comprises:

associating the second certificate authority with an account;

receiving a third request to create the first certificate authority;

determining a second type of authority associated with the first certificate authority;

determining a second identifier associated with the first certificate authority;

generating the first private key and a second public key associated with the first certificate authority; and associating the first certificate authority with the account.

7. The method as recited in claim 6, wherein the certificate is a first certificate, the certificate signing request is a first certificate signing request, and the signature is a first signature, and wherein the method further comprises:

receiving a fourth request to issue a second certificate using the first certificate authority;

generating a second certificate signing request associated with the first certificate authority, the second certificate signing request including at least the second public key;

issuing the second certificate associated with the first certificate authority based at least in part on the second certificate signing request and a second signature generated using the first private key; and sending the second certificate.

8. The method as recited in claim 4, wherein the certificate is a first certificate, and wherein the method further comprises:

after issuing the first certificate, causing the second certificate authority to operate in a disabled state, wherein the second certificate authority is prevented from issuing a second certificate based at least in part on the second certificate authority operating in the disabled state;

receiving a fifth request to operate the second certificate authority in the enabled state;

based at least in part on the fifth request, causing the second certificate authority to operate in an enabled state, wherein the second certificate authority is capable of issuing the second certificate based at least in part on the second certificate authority operating in the enabled state; and issuing the second certificate based at least in part on causing the second certificate authority to operate in the enabled state.

9. The method as recited in claim 4, further comprising: determining a key type for the second certificate authority, and wherein generating the second private key and the public key is based at least in part on the key type.

10. The method as recited in claim 4, further comprising: determining a tag to associate with the second certificate authority, the tag associated with at least identifying the second certificate authority; and associating the tag with the second certificate authority.

11. The method as recited in claim 4, further comprising:
determining a policy associated with a user of the second certificate authority, the policy including at least one of:
permission to enable the second certificate authority;
permission to disable the second certificate authority;
permission to issue a new certificate using the second certificate authority;
permission to retrieve the certificate;
permission to revoke the certificate;
permission to delete the second certificate authority; or
permission to generate an audit report for the second certificate authority; and
associating the policy with the second certificate authority.

12. The method as recited in claim 11, wherein the policy is a first policy and the user is a first user, and wherein the method further comprises:
determining a second policy associated with at least a second user of the second certificate authority, the second policy being different than the first policy; and
associating the second policy with the second certificate authority.

13. The method as recited in claim 4, further comprising:
determining a validity period associated with the certificate, the validity period indicating a time at which the certificate expires; and
associating the certificate with the validity period.

14. The method as recited in claim 4, further comprising:
determining a path length associated with the certificate; and
identifying a template based at least in part on the path length,
and wherein generating the certificate is further based at least in part on the template.

15. The method as recited in claim 4, further comprising:
generating a report associated with the second certificate authority;
based at least in part on generating the certificate, updating the report to indicate that the second certificate authority issued the certificate; and
sending the report.

16. The method as recited in claim 4, further comprising:
after issuing the certificate for the second certificate authority, causing the second certificate authority to switch from an activate state to a disabled state, wherein the second certificate authority is prevented from issuing a new certificate based at least in part on the second certificate authority being in the disabled state; and
storing the second private key in security memory.

17. An electronic device comprising:
a display;
one or more processors; and
one or more non-transitory computer-readable media storing instructions that, when executed by the one or more processors, cause the one or more processors to perform operations comprising:
receiving a first input representing a selection of a type of authority to associate with a first certificate authority;
sending, to one or more devices, a first indication of the type of authority;
receiving a second input representing an identifier to associate with the first certificate authority;
sending, to the one or more devices, a second indication of the identifier;
receiving, from the one or more devices, a third indication that the first certificate authority has been generated, the first certificate authority including the type of authority and being associated with the identifier;
receiving a third input representing a request to generate a certificate associated with the first certificate authority;
sending, to the one or more devices, the request to generate the certificate;
receiving a fourth input representing a selection of a second certificate authority to use to sign the certificate;
sending, to the one or more devices, a fourth indication of the second certificate authority; and
receiving, from the one or more devices, the certificate that is signed using the second certificate authority.

18. The electronic device as recited in claim 17, the operations further comprising:
receiving a fifth input indicating a configuration associated with the first certificate authority, the configuration indicating at least one of:
a key type for generating a private key for the first certificate authority;
a certificate revocation list for the first certificate authority;
a tag to associate with the first certificate authority; or
a policy for the first certificate authority; and
sending, to the one or more devices, a fifth indication of the configuration.

19. The electronic device as recited in claim 17, wherein the type of authority is a first type of authority and the certificate is a first certificate, and wherein the operations further comprise:
receiving a fifth input representing a selection of a second type of authority to associate with the second certificate authority;
sending, to the one or more devices, a fifth indication of the second type of authority;
receiving, from the one or more devices, a sixth indication that the second certificate authority has been generated, the second certificate authority including the second type of authority;
receiving a sixth input representing a request to generate a second certificate associated with the second certificate authority;
sending, to the one or more devices, the request to generate the second certificate; and
receiving, from the one or more devices, the second certificate.

20. The electronic device of claim 17, wherein:
the first certificate authority is a subordinate certificate authority; and
the second certificate authority is a root certificate authority.

* * * * *